United States Patent
Malladi

(10) Patent No.: US 8,374,161 B2
(45) Date of Patent: Feb. 12, 2013

(54) METHOD AND APPARATUS FOR SENDING DATA AND CONTROL INFORMATION IN A WIRELESS COMMUNICATION SYSTEM

(75) Inventor: Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1127 days.

(21) Appl. No.: 11/773,943

(22) Filed: Jul. 5, 2007

(65) Prior Publication Data

US 2008/0090528 A1 Apr. 17, 2008

Related U.S. Application Data

(60) Provisional application No. 60/819,268, filed on Jul. 7, 2006.

(51) Int. Cl.
*H04J 1/00* (2006.01)

(52) U.S. Cl. .......................... 370/343; 370/465; 370/480

(58) Field of Classification Search ........................ None
See application file for complete search history.

(56) References Cited

U.S. PATENT DOCUMENTS

| | | | |
|---|---|---|---|
| 5,732,353 A | 3/1998 | Haartsen | |
| 6,301,249 B1 | 10/2001 | Mansfield et al. | |
| 6,724,740 B1 | 4/2004 | Choi et al. | |
| 2002/0080806 A1 | 6/2002 | Haggard Ljungqvist | |
| 2002/0141367 A1 | 10/2002 | Hwang et al. | |
| 2006/0034277 A1 | 2/2006 | Jang et al. | |
| 2006/0050676 A1 | 3/2006 | Mansour | |
| 2006/0262871 A1 | 11/2006 | Cho et al. | |
| 2007/0171849 A1 | 7/2007 | Zhang et al. | |
| 2007/0171864 A1* | 7/2007 | Zhang et al. .................. 370/329 |
| 2007/0248041 A1 | 10/2007 | Seki | |
| 2008/0095106 A1 | 4/2008 | Malladi et al. | |

FOREIGN PATENT DOCUMENTS

| | | |
|---|---|---|
| EP | 0888021 A1 | 12/1998 |
| EP | 1605726 A2 | 12/2005 |
| JP | 11088304 A | 3/1999 |
| JP | 2006033778 A | 2/2006 |
| JP | 2006070466 A | 3/2006 |

(Continued)

OTHER PUBLICATIONS

Samsung: "Data and Control Multiplexing in DFT-S-OFDM" 3GPP TSG RAN WG1 # 42BIS, [Online] Oct. 10, 2005, pp. 1-5, XP002451166 San Diego, USA Retrieved from the Internet: URL:http://www.3gpp.org/ftp/tsg_ran/WG1_RL1/TSGR1_42bis/Docs/R1-051039.zip> [retrieved on Sep. 17, 2007].

(Continued)

*Primary Examiner* — Kevin C Harper
(74) *Attorney, Agent, or Firm* — Peng Zhu

(57) ABSTRACT

Techniques for sending control information in a communication system are described. In an aspect, control information may be sent in a first frequency location (e.g., a first set of subcarriers) if data is not being sent and in a second frequency location (e.g., a second set of subcarriers) if data is being sent. In another aspect, control information may be processed in accordance with a first processing scheme if data is not being sent and with a second processing scheme if data is being sent. In one design of the first scheme, a CAZAC sequence may be modulated with each modulation symbol for control information to obtain a corresponding modulated CAZAC sequence, which may be sent on the first set of subcarriers. In one design of the second scheme, modulation symbols for control information may be combined with modulation symbols for data, transformed to frequency domain, and mapped to the second set of subcarriers.

43 Claims, 15 Drawing Sheets

FOREIGN PATENT DOCUMENTS

| | | |
|---|---|---|
| RU | 2198474 | 2/2003 |
| RU | 2258314 | 10/2005 |
| TW | 200425754 | 11/2004 |
| TW | 200518607 | 6/2005 |
| TW | 200614828 | 5/2006 |
| TW | 200618645 | 6/2006 |
| WO | WO2005015801 | 2/2005 |
| WO | WO2005117385 | 8/2005 |
| WO | WO2006015334 A1 | 2/2006 |
| WO | 2007084482 | 7/2007 |

OTHER PUBLICATIONS

Huawei: "Further consideration on multiplexing method if Shared Control Channel in Uplink Single-Carrier FDMA" Internet Citation, [Online] Nov. 7, 2005, XP002451165, Seoul, Korea, Retrieved from the Internet: URL:http//www.3gpp.org/ftp/tsg_ran/WG1_RL1/TSGR1_43/Docs/R1-051430zip> [retrieved on Sep. 17, 2007].

Kawamura T et al: "Layer 1 / Layer 2 control channel structure in signal-carrier FDMA based evolved UTRA uplink" 2007 IEEE 65th Vehicular Technology Conference, Apr. 22, 2007, pp. 2941-2945, XP002483429, IEEE Piscataway, NJ, USA.

Branislav M Popovic: "Spreading sequences for Multicarrier CDMA Systems" IEEE Transactions on Communications, IEEE Service Center, Piscataway, NJ, US, vol. 47, No. 6, Jun. 1, 1999, XP011009440.

Carni E et al: "Synchronous CDMA Based on the Cyclical Translations of a CAZAC Sequence" Wireless Communication Systems, 2005. 2nd International Symposium on Siena, Italy Sep. 5-9, 2005, Piscataway, NJ, USA, IEEE, pp. 442-446, XP010886290.

Byoung-Jo Choi et al: "Crest-factor study of MC-CDMA and OFDM" Vehicular Technology Conference, 199. VTC 1999-Fall. IEEE VTS 50th Amsterdam, Netherlands Sep. 19-22, 1999, Piscataway, NJ, USA, IEEE, US, vol. 1, pp. 233-237, XP010352874.

Qualcomm Europe: "Link Analysis of ACK Channel in Uplink" 3GPP TSG RAN WG1#45, [Online] May 8, 2006, pp. 1-8, XP002483430, Shanghai, China, Retrieved from the Internet: URL:http://www.3gpp.org/ftp/tsg_ran/WG1_RL1/TSGR1_45/Docs/R1-061517.zip> [retrieved on Jun. 6, 2008].

International Search Report—PCT/US2007/072990, International Search Authority—European Patent Office—Jun. 23, 2008.

Written Opinion—PCT/US2007/072990, International Search Authority—European Patent Office—Jun. 23, 2008.

3rd Generation Partnership Project: "Physical layer aspects for evolved Universal Terrestrial Radio Access (UTRA). Release 7" (Online) Jun. 15, 2006, pp. 67-78, XP002474356.

Motorola: "E-UTRA Uplink Control Channel Design and TP" #GPP TSG RANWG1 #44, (Online) Feb. 13-17, 2006 XP002474357.

Motorola: "Uplink Control Signaling Considerations for E-UTRA" 3GPP TSG RAN WG1 #45, (Online) May 8-12, 2006, XP002474358.

Kobayashi H et al: "Proposal of single carrier OFDM technique with adaptive modulation method" The 57th IEEE Semiannual Vehicular Technology Conference Held In Jeju, Korea, vol. 4, Apr. 22-25, 2003 pp. 1915-1919, XP010862477 New York, NY, USA ISBN: 0-7803-7757-5.

Partial International Search Report—PCT/US07/072990, International Search Authority—European Patent Office—Apr. 14, 2008.

Popovic B.M., Spreading Sequence for Multi-Carrier CDMA Systems IEE colloquiums on CDMA techniques and Applications for Third Generation Mobile Systems (1997).

Interdigital; "Scheduling and Multiplexing of CQI and ACK/NACK Feedback for Single Carrier FDMA in Evolved UTRA Uplink", TSG-RAN WG1 WG1 LTE Ad Hoc Meeting, Document #R1-060155, Helsinki, Finland, pp. 1-8, XP002446639, Jan. 23-25, 2006.

Ntt DoCoMo et. al., "Data-non-associated L1/L2 Control Channel Structure for E-UTRA Uplink",3GPP TSG RAN WG1 LTE Ad Hoc R1-061675, Jun. 30, 2006, pp. 1-6.

Taiwan Search Report—TW096125004—TIPO—Aug. 1, 2011.

* cited by examiner

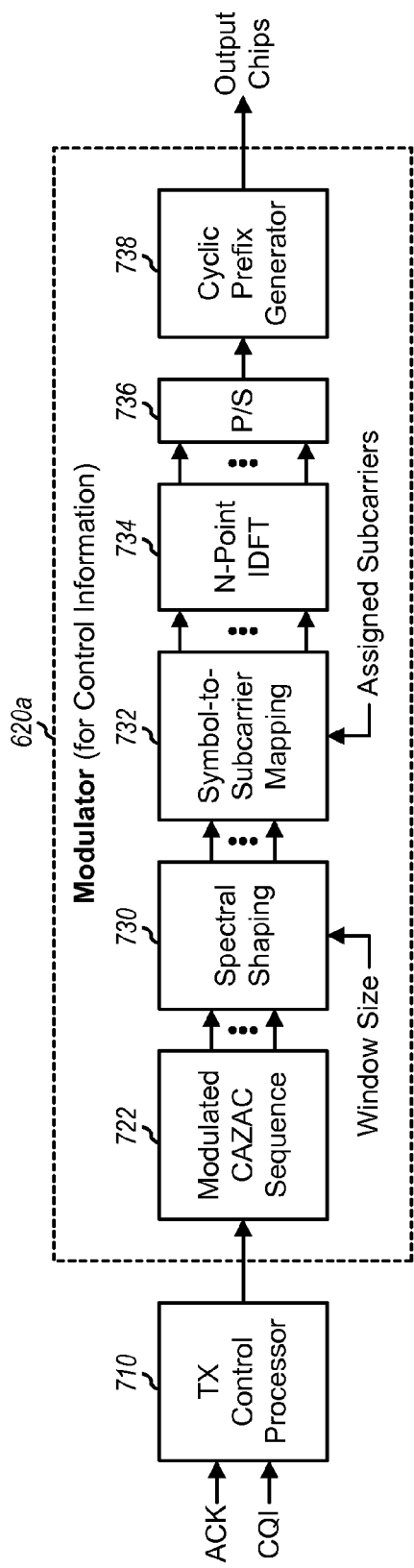
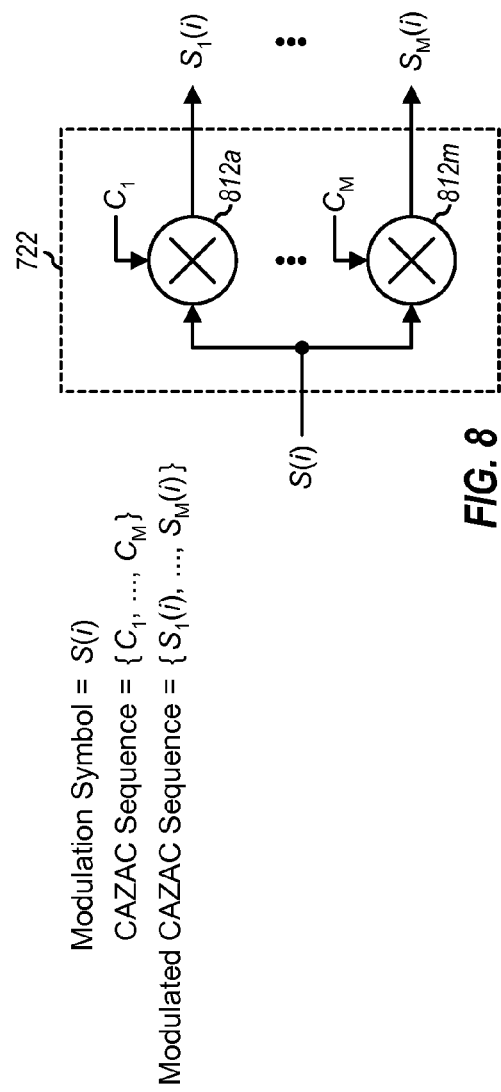
FIG. 7
FIG. 8
Modulation Symbol = $S(i)$
CAZAC Sequence = $\{C_1, ..., C_M\}$
Modulated CAZAC Sequence = $\{S_1(i), ..., S_M(i)\}$

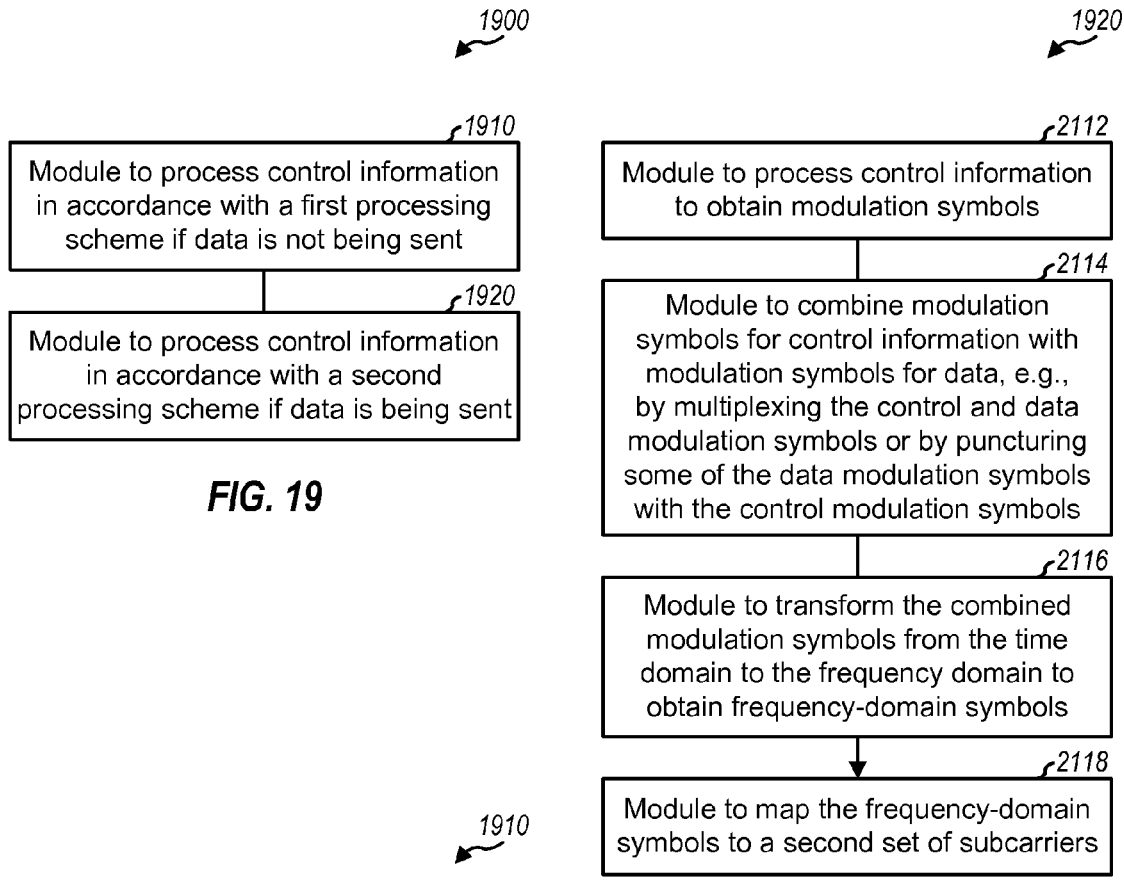
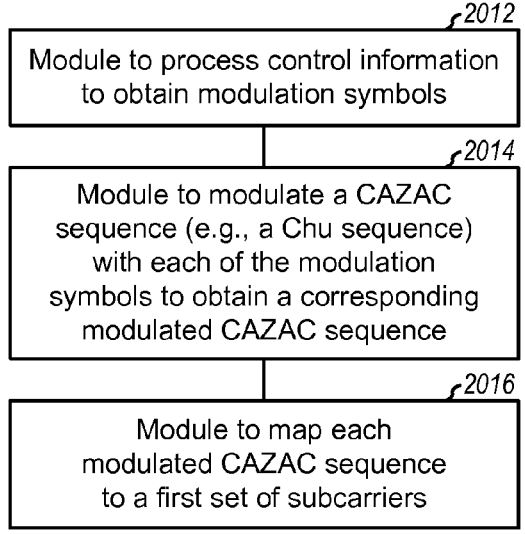
FIG. 19
FIG. 20
FIG. 21

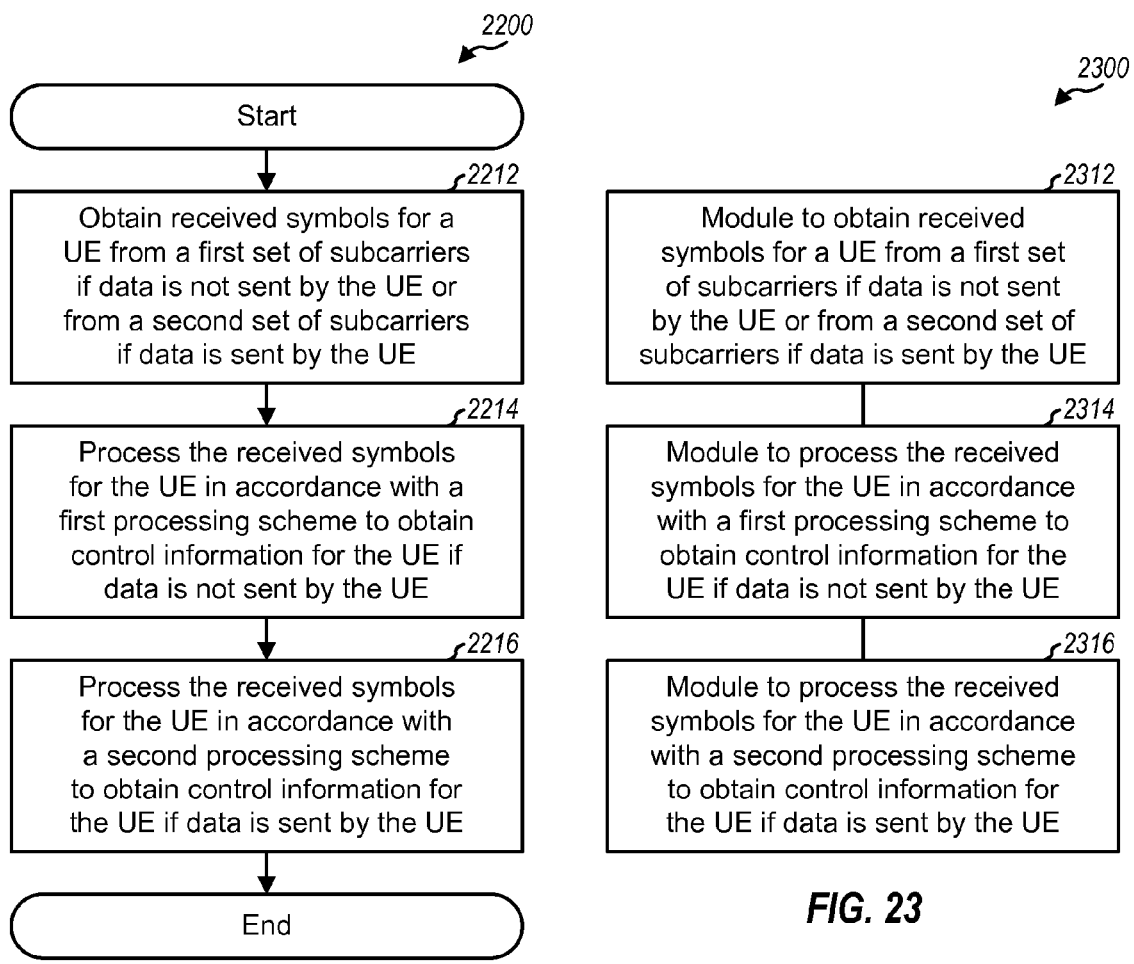

METHOD AND APPARATUS FOR SENDING DATA AND CONTROL INFORMATION IN A WIRELESS COMMUNICATION SYSTEM

The present application claims priority to provisional U.S. Application Ser. No. 60/819,268, entitled "A METHOD AND APPARATUS FOR AN ACK CHANNEL FOR OFDMA SYSTEM," filed Jul. 7, 2006, assigned to the assignee hereof and incorporated herein by reference.

BACKGROUND

I. Field

The present disclosure relates generally to communication, and more specifically to techniques for sending data and control information in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a Node B (or base station) may transmit data to a user equipment (UE) on the downlink and/or receive data from the UE on the uplink. The downlink (or forward link) refers to the communication link from the Node B to the UE, and the uplink (or reverse link) refers to the communication link from the UE to the Node B. The Node B may also transmit control information (e.g., assignments of system resources) to the UE. Similarly, the UE may transmit control information to the Node B to support data transmission on the downlink and/or for other purposes. It is desirable to send data and control information as efficiently as possible in order to improve system performance.

SUMMARY

Techniques for sending data and control information in a wireless communication system are described herein. Control information may comprise acknowledgement (ACK) information, channel quality indicator (CQI) information, and/or other information. A UE may send only control information, or only data, or both control information and data in a given time interval.

In an aspect, control information may be sent in a first frequency location if data is not being sent and in a second frequency location if data is being sent. The first frequency location may correspond to a first set of subcarriers assigned to the UE for sending control information and may be associated with an assignment of subcarriers for downlink transmission. The second frequency location may correspond to a second set of subcarriers assigned to the UE for sending data when there is data to send. The first and second sets may each include contiguous subcarriers, which may improve peak-to-average ratio (PAR) of a single-carrier frequency division multiplexing (SC-FDM) waveform carrying control information and/or data.

In another aspect, control information may be processed in accordance with a first processing scheme if data is not being sent and in accordance with a second processing scheme if data is being sent. For both schemes, control information may be processed (e.g., encoded and symbol mapped) to obtain modulation symbols. In one design of the first processing scheme, a CAZAC (constant amplitude zero auto-correlation) sequence may be modulated with each of the modulation symbols to obtain a corresponding modulated CAZAC sequence, which may then be mapped to the first set of subcarriers. In one design of the second processing scheme, the modulation symbols for control information may be combined with modulation symbols for data, e.g., by multiplexing these modulation symbols or by puncturing some of the modulation symbols for data. The combined modulation symbols may be transformed from the time domain to the frequency domain and then mapped to the second set of subcarriers. For both schemes, SC-FDM symbols may be generated based on the symbols mapped to the first or second set of subcarriers.

The modulation symbols for control information may be generated based on a first modulation scheme (e.g., a fixed modulation scheme such as QPSK) if data is not being sent. These modulation symbols may be generated based on a second modulation scheme (e.g., a modulation scheme used for data) if data is being sent. Control information may also be encoded based on a first coding scheme if data is not being sent and based on a second coding scheme if data is being sent.

Various aspects and features of the disclosure are described in further detail below.

BRIEF DESCRIPTION OF THE DRAWINGS

FIG. 7 shows a block diagram of a modulator for control information.

FIG. 8 shows a block diagram of a modulated CAZAC sequence unit.

FIGS. 16 and 19 show a process and an apparatus, respectively, for sending control information with different processing schemes.

FIGS. 17 and 20 show a process and an apparatus, respectively, for sending control information based on a first processing scheme when no data is being sent.

FIGS. 18 and 21 show a process and an apparatus, respectively, for sending control information based on a second processing scheme when data is being sent.

FIGS. 22 and 23 show a process and an apparatus, respectively, for receiving control information with different processing schemes.

DETAILED DESCRIPTION

Figure 1:
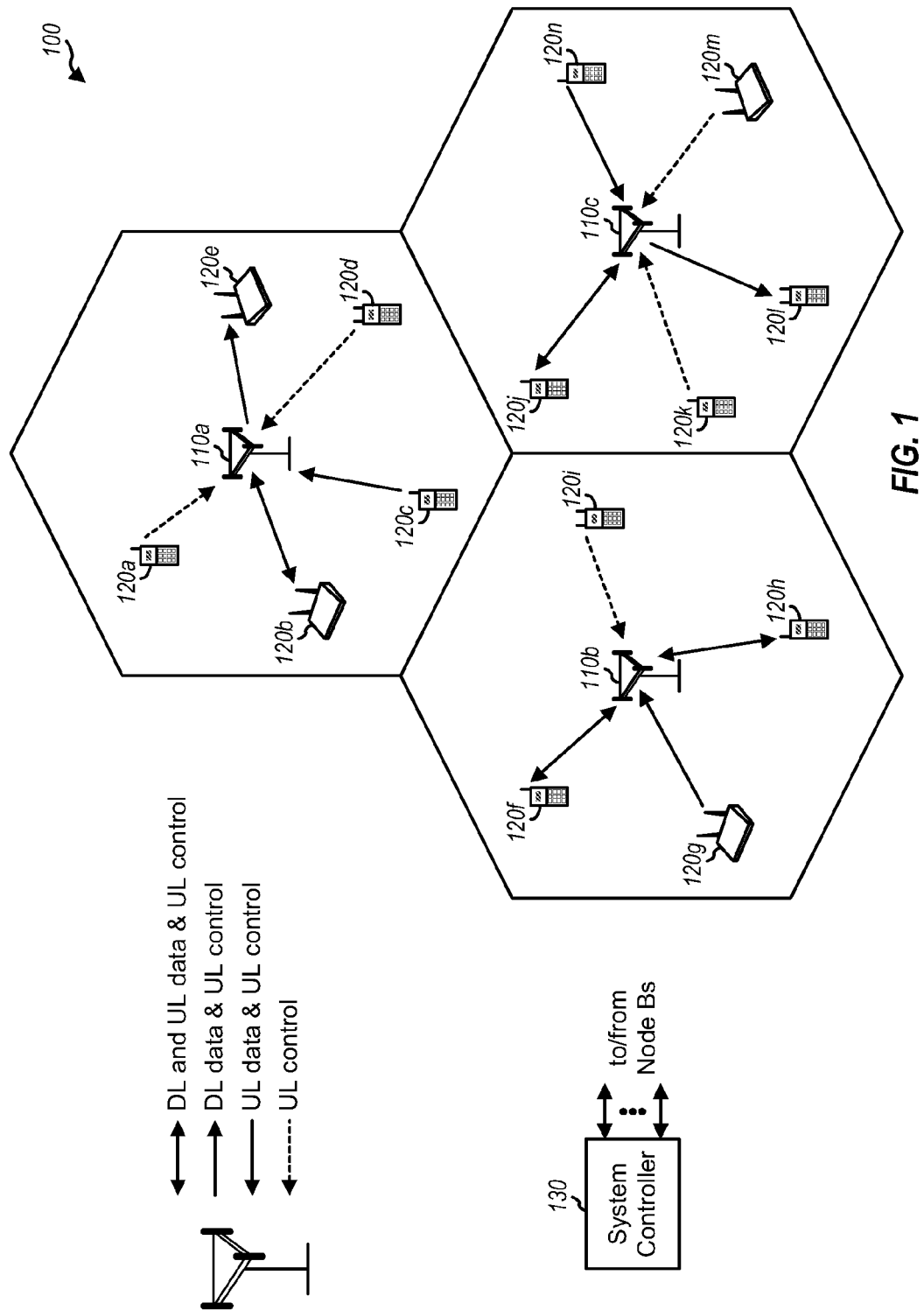
FIG. 1 shows a wireless communication system.

FIG. 1 shows a wireless communication system 100 with multiple Node Bs 110 and multiple UEs 120. A Node B is generally a fixed station that communicates with the UEs and may also be referred to as an evolved Node B (eNode B), a base station, an access point, etc. Each Node B 110 provides communication coverage for a particular geographic area and supports communication for the UEs located within the coverage area. The term "cell" can refer to a Node B and/or its coverage area depending on the context in which the term is used. A system controller 130 may couple to the Node Bs and provide coordination and control for these Node Bs. System controller 130 may be a single network entity or a collection of network entities, e.g., an Access Gateway (AGW), a Radio Network Controller (RNC), etc.

UEs 120 may be dispersed throughout the system, and each UE may be stationary or mobile. A UE may also be referred to as a mobile station, a mobile equipment, a terminal, an access terminal, a subscriber unit, a station, etc. A UE may be a cellular phone, a personal digital assistant (PDA), a wireless communication device, a handheld device, a wireless modem, a laptop computer, etc.

A Node B may transmit data to one or more UEs on the downlink and/or receive data from one or more UEs on the uplink at any given moment. The Node B may also transmit control information to the UEs and/or receive control information from the UEs. In FIG. 1, a solid line with double arrows (e.g., between Node B 110a and UE 120b) represents data transmission on the downlink and uplink, and transmission of control information on the uplink. A solid line with a single arrow pointing to a UE (e.g., UE 120e) represents data transmission on the downlink, and transmission of control information on the uplink. A solid line with a single arrow pointing from a UE (e.g., UE 120c) represents transmission of data and control information on the uplink. A dashed line with a single arrow pointing from a UE (e.g., UE 110a) represents transmission of control information (but no data) on the uplink. Transmission of control information on the downlink is not shown in FIG. 1 for simplicity. A given UE may receive data on the downlink, transmit data on the uplink, and/or transmit control information on the uplink at any given moment.

Figure 2:
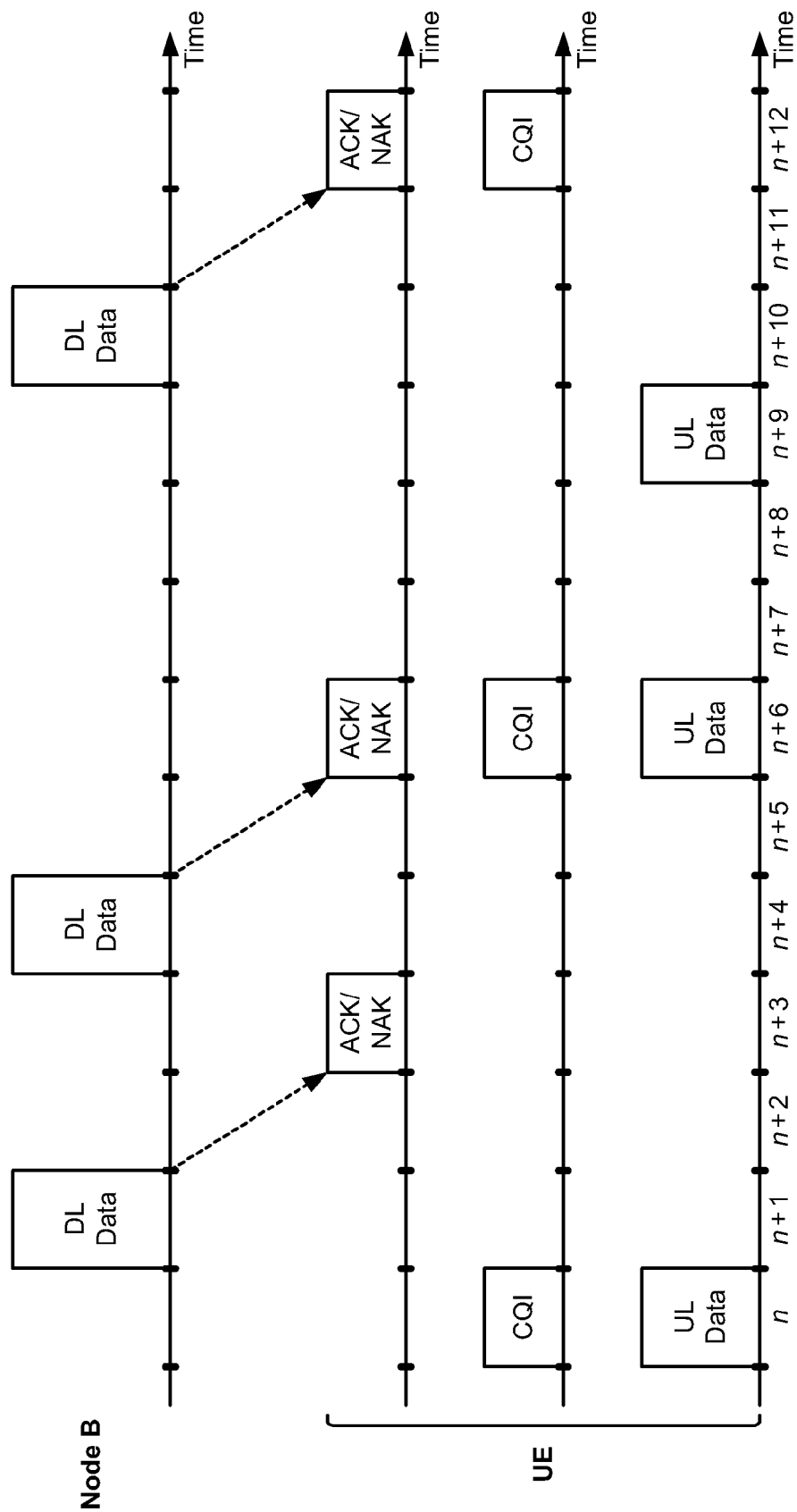
FIG. 2 shows downlink transmission by a Node B and uplink transmission by a UE.

FIG. 2 shows example downlink transmission by a Node B and uplink transmission by a UE. The UE may periodically estimate the downlink channel quality for the Node B and may send CQI to the Node B. The Node B may use the CQI to select a suitable rate (e.g., a code rate and a modulation scheme) to use for downlink data transmission to the UE. The Node B may process and transmit data to the UE whenever there is data to send and system resources are available. The UE may process a downlink data transmission from the Node B and may send an acknowledgement (ACK) if the data is decoded correctly or a negative acknowledgement (NAK) if the data is decoded in error. The Node B may retransmit the data if a NAK is received and may transmit new data if an ACK is received. The UE may also transmit data on the uplink to the Node B whenever there is data to send and the UE is assigned uplink resources.

As shown in FIG. 2, the UE may transmit data and/or control information, or neither, in any given time interval. The control information may also be referred to as control, overhead, signaling, etc. The control information may comprise ACK/NAK, CQI, other information, or any combination thereof. The type and amount of control information may be dependent on various factors such as the number of data streams being sent, whether multiple-input multiple-output (MIMO) is used for transmission, etc. For simplicity, much of the following description assumes that control information comprises ACK and CQI information. In the example shown in FIG. 2, the UE transmits data and control information in time intervals n and n+6, only control information in time intervals n+3 and n+12, only data in time interval n+9, and no data or control information in the remaining time intervals in FIG. 2. The UE may efficiently transmit data and/or control information as described below.

In general, the transmission techniques described herein may be used for uplink transmission as well as downlink transmission. The techniques may also be used for various wireless communication systems such as CDMA, TDMA, FDMA, OFDMA, and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (W-CDMA) and Low Chip Rate (LCR). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), IEEE 802.11, IEEE 802.16, IEEE 802.20, Flash-OFDM®, etc. These various radio technologies and standards are known in the art. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for uplink transmission in LTE, and 3GPP terminology is used in much of the description below.

LTE utilizes orthogonal frequency division multiplexing (OFDM) on the downlink and single-carrier frequency division multiplexing (SC-FDM) on the uplink. OFDM and SC-FDM partition the system bandwidth into multiple (N) orthogonal subcarriers, which are also commonly referred to as tones, bins, etc. Each subcarrier may be modulated with data. In general, modulation symbols are sent in the frequency domain with OFDM and in the time domain with SC-FDM. For LTE, the spacing between adjacent subcarriers may be fixed, and the total number of subcarriers (N) may be dependent on the system bandwidth. In one design, N=512 for a system bandwidth of 5 MHz, N=1024 for a system bandwidth of 10 MHz, and N=2048 for a system bandwidth of 20 MHz. In general, N may be any integer value.

Figure 3:
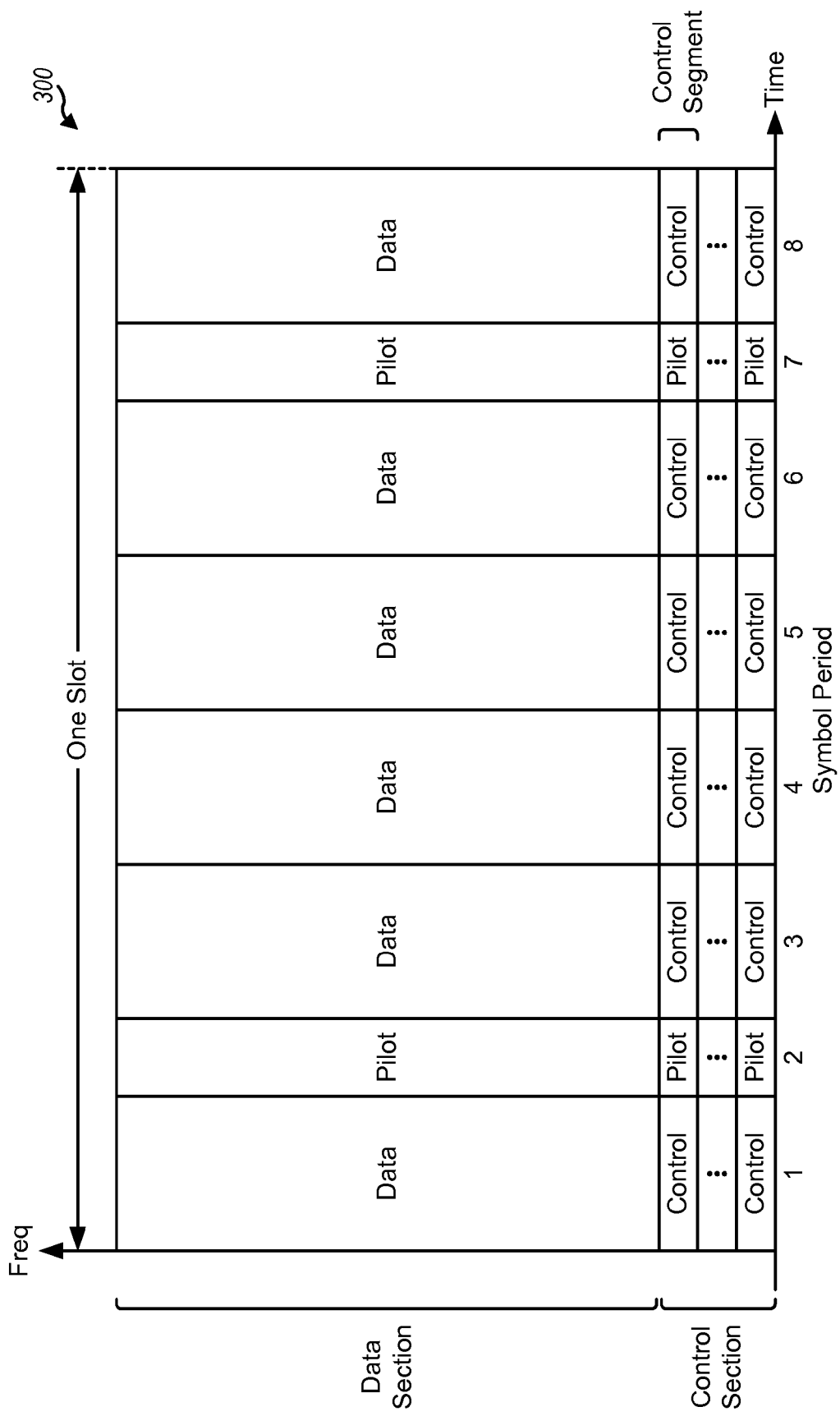
FIG. 3 shows a structure for transmitting data and control information.

FIG. 3 shows a design of a structure 300 that may be used for sending data and control information. The transmission time line may be partitioned into slots. A slot may have a fixed duration, e.g., 0.5 milliseconds (ms), or a configurable duration and may also be referred to as a transmission time interval (TTI), etc. In the design shown in FIG. 3, a slot includes eight symbol periods—six long symbol periods used for data and control information and two short symbol periods used for pilot. Each short symbol period may be half the duration of a long symbol period. A short symbol period may correspond to a short block (SB), and a long symbol period may correspond to a long block (LB). In another design, a slot includes seven symbol periods of equal duration—six symbol periods used for data and control information and one symbol period (e.g., in the middle of the slot) used for pilot. In general, a slot may include any number of symbol periods, which may have equal or different durations. Each symbol period may be used for data, control information, pilot, or any combination thereof.

In the design shown in FIG. 3, the N total subcarriers may be divided into a data section and a control section. The control section may be formed at the lower edge of the system bandwidth, as shown in FIG. 3. Alternatively or additionally, a control section may be formed at the upper edge of the system bandwidth. A control section may have a configurable size, which may be selected based on the amount of control information being sent on the uplink by the UEs. The data section may include all subcarriers not included in the control section(s). The design in FIG. 3 results in the data section including contiguous subcarriers, which allows a single UE to be assigned all of the contiguous subcarriers in the data section.

A UE may be assigned a control segment of M contiguous subcarriers, where M may be a fixed or configurable value. A control segment may also be referred to as a physical uplink control channel (PUCCH). In one design, a control segment includes an integer multiple of 12 subcarriers. There may be a mapping between subcarriers assigned to the UE for downlink data transmission and subcarriers in the control segment for the UE. The UE would then know which subcarriers to use for its control segment based on the assigned subcarriers for the downlink. The UE may also be assigned a data segment of Q contiguous subcarriers, where Q may be a fixed or configurable value. A data segment may also be referred to as a physical uplink shared channel (PUSCH). In one design, a data segment includes an integer multiple of 12 subcarriers. The UE may also be assigned no data segment or no control segment in a given slot.

It may be desirable for a UE to transmit on contiguous subcarriers using SC-FDM, which is referred to as localized frequency division multiplexing (LFDM). Transmitting on contiguous subcarriers (instead of non-contiguous subcarriers) may result in a lower peak-to-average ratio (PAR). PAR is the ratio of the peak power of a waveform to the average power of the waveform. A low PAR is desirable since it may allow a power amplifier (PA) to be operated at an average output power closer to the peak output power. This, in turn, may improve throughput and/or link margin for the UE.

The UE may be assigned a control segment located near an edge of the system bandwidth. The UE may also be assigned a data segment within the data section. The subcarriers for the control segment may not be adjacent to the subcarriers for the data segment. The UE may send data in the data segment and may send control information in the control segment. In this case, the data and control information may be sent on non-contiguous subcarriers in different parts of the system bandwidth, and the resulting waveform may have higher PAR.

In an aspect, the UE may send control information in different frequency locations depending on whether or not there is data to send. The UE may send control information in an assigned control segment if there is no data to send on the uplink. The UE may send control information and data in an assigned data segment if there is data to send on the uplink. This dynamic transmission of control information allows the UE to transmit on contiguous subcarriers regardless of whether or not data is being sent.

Figure 4A:
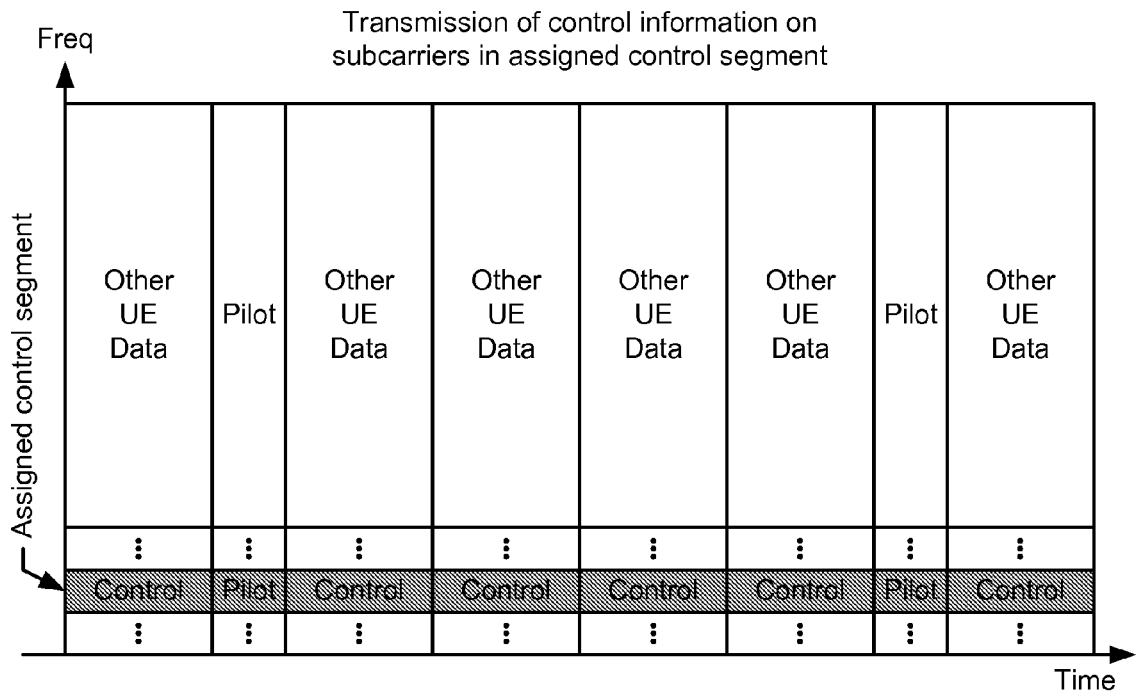
FIG. 4A shows transmission of control information on the uplink.

FIG. 4A shows transmission of control information when there is no data to send on the uplink. In this case, the UE may send control information on an assigned control segment in each symbol period not used for pilot, or non-pilot symbol period. The UE may also transmit pilot in each symbol period used for pilot, or pilot symbol period. In each non-pilot symbol period, the transmission from the UE may occupy a set of contiguous subcarriers in the assigned control segment. The remaining subcarriers may be used by other UEs for uplink transmission.

Figure 4B:
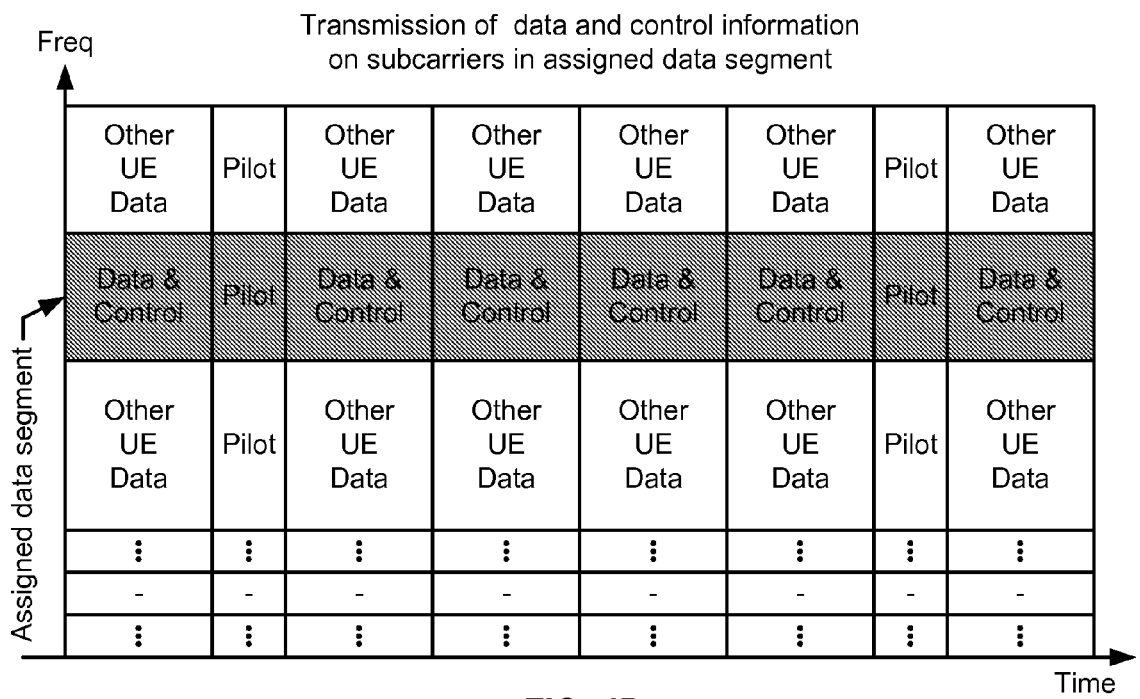
FIG. 4B shows transmission of control information and data on the uplink.

FIG. 4B shows transmission of control information when there is data to send on the uplink. In this case, the UE may send control information and data on an assigned data segment in each non-pilot symbol period. The UE may process control information and generate modulation symbols. The UE may also process data and generate modulation symbols. The UE may multiplex the modulation symbols for control information with the modulation symbols for data. Alternatively, the UE may puncture (or replace) some of the modulation symbols for data with the modulation symbols for control information. The UE may also send control information and data in other manners. The UE may also transmit pilot in each pilot symbol period. In each non-pilot symbol period, the transmission from the UE may occupy a set of contiguous subcarriers in the assigned data segment. The remaining subcarriers, if any, may be used by other UEs for uplink transmission.

The system may use frequency hopping to provide frequency diversity against deleterious path effects and randomization of interference. With frequency hopping, the UE may be assigned different sets of subcarriers in different hop periods. A hop period is an amount of time spent on a given set of subcarriers and may correspond to one slot or some other duration. Different sets of subcarriers may be selected based on a hopping pattern that may be known by the UE.

Figure 5A:
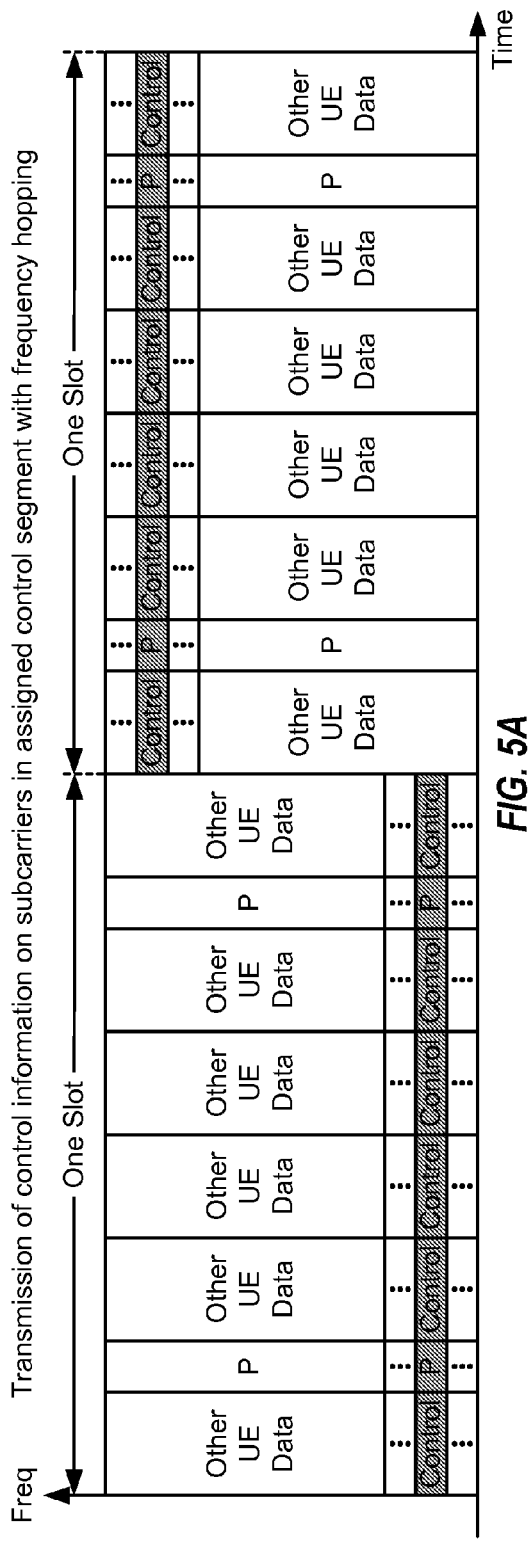
FIG. 5A shows transmission of control information with frequency hopping.

FIG. 5A shows transmission of control information with frequency hopping when there is no data to send on the uplink. In this design, the UE may be assigned a different set of subcarriers for the control segment in each slot. The UE may send control information on the subcarriers for the control segment in each non-pilot symbol period. The UE may transmit pilot in each pilot symbol period. In each non-pilot symbol period, the transmission from the UE may occupy a set of contiguous subcarriers assigned to the UE. The remaining subcarriers may be used by other UEs for uplink transmission.

Figure 5B:
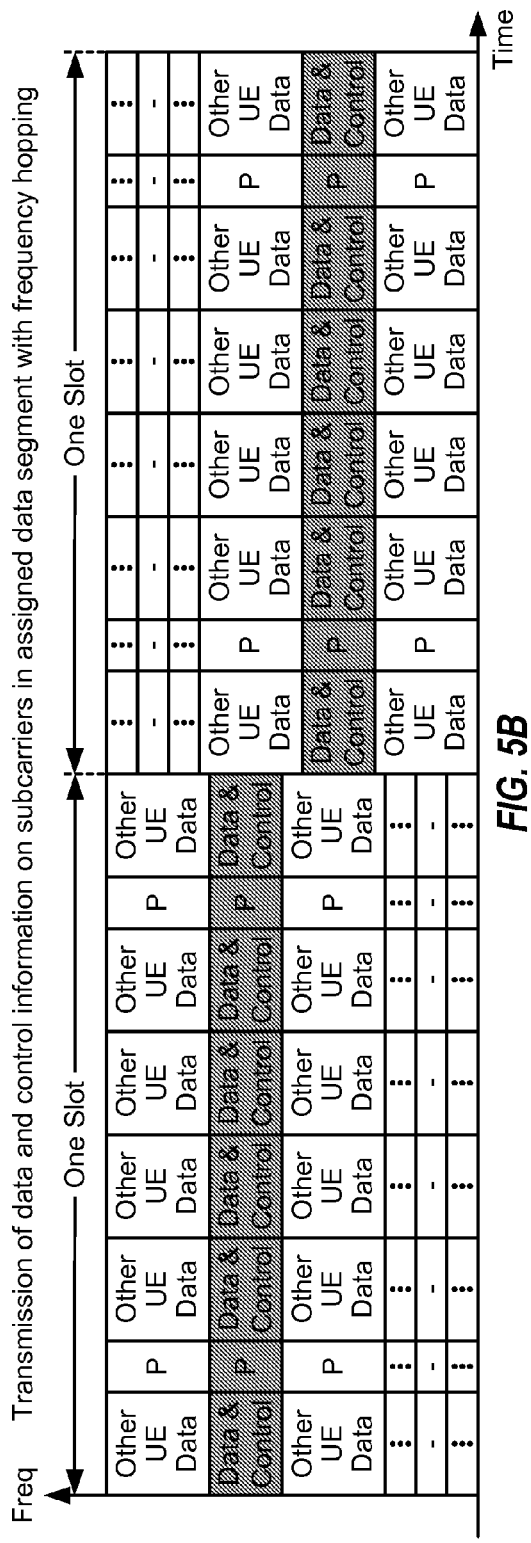
FIG. 5B shows transmission of control information and data with frequency hopping.

FIG. 5B shows transmission of control information and data with frequency hopping. In this design, the UE may be assigned a different set of subcarriers for the data segment in each slot. The UE may send control information and data on the subcarriers for the data segment in each non-pilot symbol period. The UE may transmit pilot in each pilot symbol period. In each non-pilot symbol period, the transmission from the UE may occupy a set of contiguous subcarriers assigned to the UE. The remaining subcarriers, if any, may be used by other UEs for uplink transmission.

FIGS. 5A and 5B show frequency hopping from slot to slot, with each hop period corresponding to one slot. Frequency hopping may also be performed over other hop periods or time intervals. For example, frequency hopping may also be performed from subframe to subframe (where one subframe may be equal to two slots), from symbol period to symbol period, etc.

FIGS. 3 through 5B show an example structure for sending control information and data. Other structures may also be used to send control information and data. In general, control information and data may be sent using frequency division multiplexing (FDM), time division multiplexing (TDM), and/or other multiplexing schemes.

Figure 6:
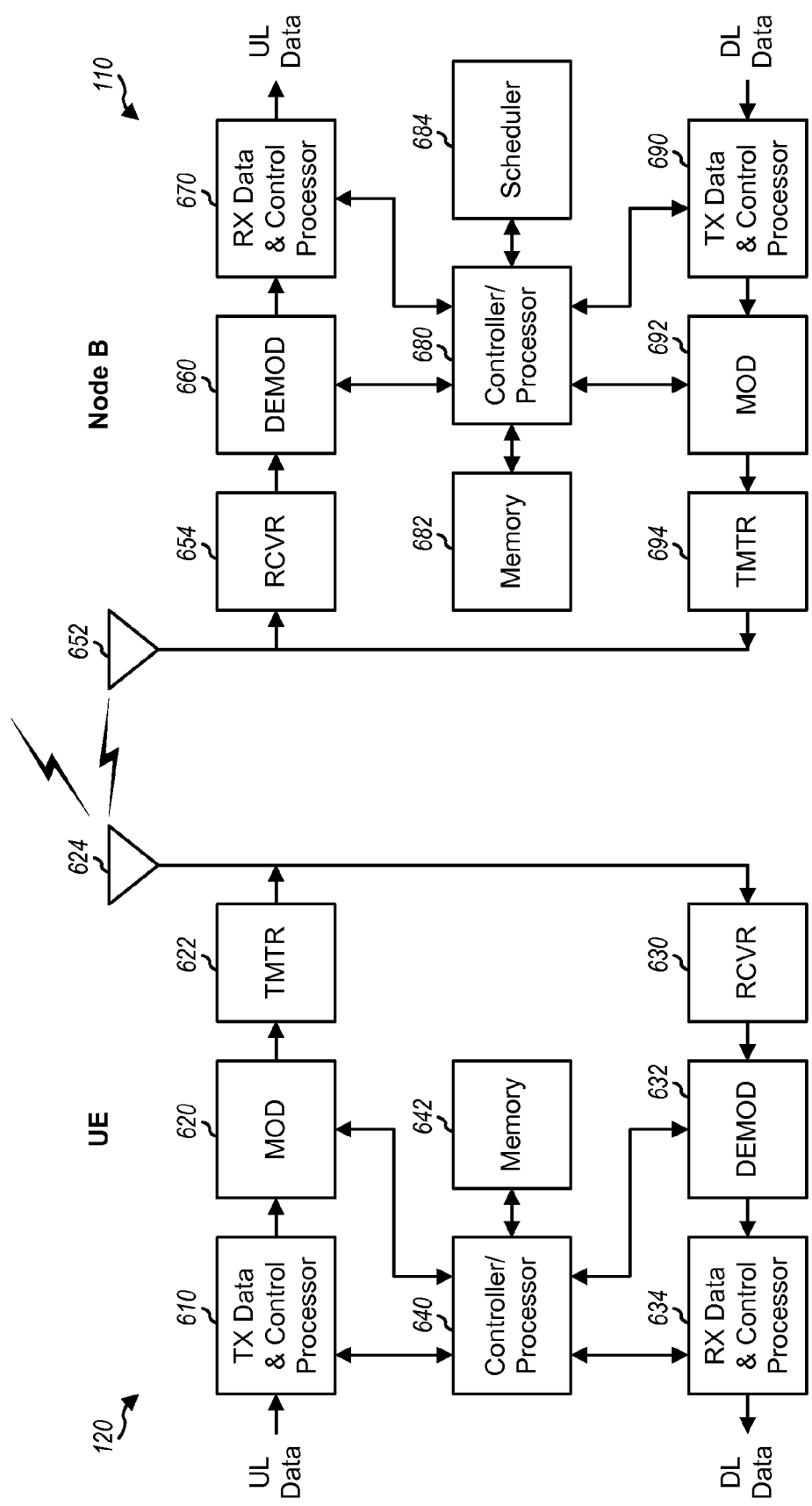
FIG. 6 shows a block diagram of a Node B and a UE.

FIG. 6 shows a block diagram of a design of a Node B 110 and a UE 120, which are one of the Node Bs and one of the UEs in FIG. 1. At UE 120, a transmit (TX) data and control processor 610 may receive uplink (UL) data from a data source (not shown) and/or control information from a controller/processor 640. Processor 610 may process (e.g., format, encode, interleave, and symbol map) the data and control information and provide modulation symbols. A modulator (MOD) 620 may process the modulation symbols as described below and provide output chips. A transmitter (TMTR) 622 may process (e.g., convert to analog, amplify, filter, and frequency upconvert) the output chips and generate an uplink signal, which may be transmitted via an antenna 624.

At Node B 120, an antenna 652 may receive the uplink signals from UE 120 and other UEs and provide a received signal to a receiver (RCVR) 654. Receiver 654 may condition (e.g., filter, amplify, frequency downconvert, and digitize) the received signal and provide received samples. A demodulator (DEMOD) 660 may process the received samples as described below and provide demodulated symbols. A receive (RX) data and control processor 670 may process (e.g., symbol demap, deinterleave, and decode) the demodulated symbols to obtain decoded data and control information for UE 120 and other UEs.

On the downlink, at Node B 120, downlink (DL) data and control information to be sent to the UEs may be processed by a TX data and control processor 690, modulated by a modulator 692 (e.g., for OFDM), conditioned by a transmitter 694, and transmitted via antenna 652. At UE 120, the downlink signals from Node B 110 and possibly other Node Bs may be received by antenna 624, conditioned by a receiver 630, demodulated by a demodulator 632 (e.g., for OFDM), and processed by an RX data and control processor 634 to recover the downlink data and control information sent by Node B 110 to UE 120. In general, the processing for uplink transmission may be similar to or different from the processing for downlink transmission.

Controllers/processors 640 and 680 may direct the operations at UE 120 and Node B 110, respectively. Memories 642 and 682 may store data and program codes for UE 120 and Node B 110, respectively. A scheduler 684 may schedule UEs for downlink and/or uplink transmission and may provide assignments of system resources e.g., assignments of subcarriers for downlink and/or uplink.

FIG. 7 shows a block diagram of a design of a modulator 620a for control information. Modulator 620a may be used for modulator 620 at UE 120 in FIG. 6. A TX control processor 710, which may be part of TX data and control processor 610 in FIG. 6, may receive ACK and/or CQI information to be sent in a subframe, which may be two slots or some other duration. TX control processor 710 may process ACK information to generate one or more modulation symbols for ACK. In one design, TX control processor 710 may map an ACK/NAK to a QPSK modulation symbol, e.g., map an ACK to one QPSK value (e.g., 1+j) and a NAK to another QPSK value (e.g., −1−j). Alternatively or additionally, TX control processor 710 may process CQI information to generate modulation symbols for CQI. In one design, TX control processor 710 may encode the CQI information based on a block code to obtain code bits and may then map the code bits to QPSK modulation symbols. In general, TX control processor 710 may process the ACK and CQI information either separately or jointly. The number of modulation symbols to generate for the ACK and/or CQI information may be dependent on the modulation scheme/order used for ACK and CQI, the block code rate, the number of symbol periods available for transmitting the ACK and CQI information, etc. TX control processor 710 may provide modulation symbols for the ACK and/or CQI information.

Within modulator 620a, a unit 722 may receive the modulation symbols for the ACK and/or CQI information from TX control processor 710, e.g., one modulation symbol for each non-pilot symbol period. In each non-pilot symbol period, unit 722 may modulate a CAZAC sequence of length M with the modulation symbol for that symbol period and provide a modulated CAZAC sequence with M modulated symbols, where M is the number of subcarriers in the control segment assigned to UE 120. The processing by unit 722 is described below.

A spectral shaping unit 730 may receive the M modulated symbols from unit 722, perform spectral shaping on these symbols in the frequency domain based on a window size, and provide M spectrally shaped symbols. The spectral shaping may attenuate or roll off the symbols in the high and low subcarriers of the control segment in order to reduce time-domain transient in an output waveform. The spectral shaping may be based on a raised cosine window or some other window function. The window size may indicate the number of subcarriers to be used for transmission. A symbol-to-subcarrier mapping unit 732 may map the M spectrally shaped symbols to the M subcarriers in the control segment assigned to UE 120 and may map zero symbols with signal value of zero to the N-M remaining subcarriers.

An inverse discrete Fourier transform (IDFT) unit 734 may receive N mapped symbols for the N total subcarriers from mapping unit 732, perform an N-point IDFT on these N symbols to transform the symbols from the frequency domain to the time domain, and provide N time-domain output chips. Each output chip is a complex value to be transmitted in one chip period. A parallel-to-serial converter (P/S) 736 may serialize the N output chips and provide a useful portion of an SC-FDM symbol. A cyclic prefix generator 738 may copy the last C output chips of the useful portion and append these C output chips to the front of the useful portion to form an SC-FDM symbol containing N+C output chips. The cyclic prefix is used to combat inter-symbol interference (ISI) caused by frequency selective fading. The SC-FDM symbol may be sent in one SC-FDM symbol period, which may be equal to N+C chip periods.

A CAZAC sequence is a sequence having good temporal characteristics (e.g., a constant time-domain envelope) and good spectral characteristics (e.g., a flat frequency spectrum). Some example CAZAC sequences include a Chu sequence, a Zadoff-Chu sequence, a Frank sequence, a generalized chirp-like (GCL) sequence, a Golomb sequence, P1, P3, P4 and Px sequences, etc., which are known in the art. In one design, a Chu sequence is used to send control information. A Chu sequence of length M may be expressed as:

$$C_m = e^{j\phi_m}, \text{ for } m=1,\ldots,M, \text{ Eq} \qquad (1)$$

where $\phi_m$ is the phase of the m-th symbol or value in the Chu sequence, and $C_m$ is the m-th symbol in the Chu sequence.

The phase $\phi_m$ for the Chu sequence may be expressed as:

$$\varphi_m = \begin{cases} \pi \cdot (m-1)^2 \cdot F/M & \text{for } M \text{ even,} \\ \pi \cdot (m-1) \cdot m \cdot F/M & \text{for } M \text{ odd,} \end{cases} \qquad \text{Eq}(2)$$

where F and M are relatively prime.

FIG. 8 shows a design of modulated CAZAC sequence unit 722 in FIG. 7. Within unit 722, M multipliers 812a through 812*m* may receive the M symbols $C_1$ through $C_M$, respectively, in the Chu sequence. Each multiplier 812 may also receive a modulation symbol S(i) to be sent in one symbol period, multiply its Chu symbol $C_m$ with the modulation symbol S(i), and provide a modulated symbol $S_m(i)$, where $m \in \{1, \ldots, M\}$. M multipliers 812*a* through 812*m* may provide M modulated symbols $S_1(i)$ through $S_M(i)$, respectively, for modulation symbol S(i).

Modulating the Chu sequence (or some other CAZAC sequence) with a modulation symbol does not destroy the good temporal and spectral characteristics of the Chu sequence. A waveform generated with a modulated Chu sequence may have lower PAR than a waveform generated by repeating the modulation symbol M times. This may allow the waveform for the modulated Chu sequence to be transmitted at higher power, which may improve reliability for the modulation symbol sent in the modulated Chu sequence. A pseudo-CAZAC sequence with a small non-zero autocorrelation and small variations in amplitude may also be used instead of a true CAZAC sequence with zero autocorrelation and no variations in amplitude.

Referring back to FIG. 7, for each subframe in which control information is sent, TX control processor 710 may provide L modulation symbols for control information, e.g., one modulation symbol in each non-pilot symbol period of the subframe. L may be equal to the number of non-pilot symbol periods in a subframe and may be equal to 12 for the design shown in FIG. 3. Each modulation symbol may modulate the Chu sequence as shown in FIG. 8, and the modulated Chu sequence may be sent on M contiguous subcarriers of the control segment in one symbol period. If only ACK information is sent, then TX control processor 710 may generate a modulation symbol for the ACK information, repeat this modulation symbol to obtain L modulation symbols, and provide one modulation symbol in each non-pilot symbol period. If only CQI information is sent, then TX control processor 710 may encode the CQI information based on a block code to obtain code bits, map the code bits to L modulation symbols, and provide one modulation symbol for CQI in each non-pilot symbol period. If both ACK and CQI information is sent, then TX control processor 710 may encode the ACK and CQI information jointly based on another block code to obtain code bits, map the code bits to L modulation symbols, and provide one modulation symbol in each non-pilot symbol period. TX control processor 710 may also process the ACK and/or CQI information in other manners. The number of modulation symbols to provide for the control information may be dependent on the number of non-pilot symbols in a subframe. The number of code bits (and hence the block code) may be dependent on the number of modulation symbols, the modulation scheme, and the number of bits for the control information. In any case, the modulation symbols may be sent at a proper transmit power level, which may be dependent on whether ACK and/or CQI information is being sent.

Figure 9:
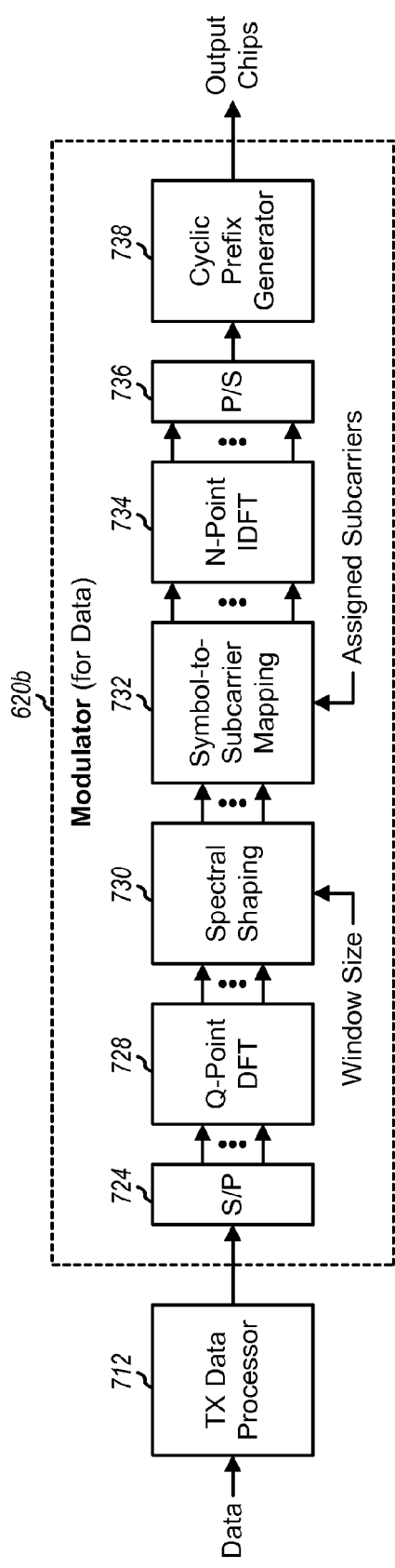
FIG. 9 shows a block diagram of a modulator for data.

FIG. 9 shows a block diagram of a design of a modulator 620*b* for data. Modulator 620*b* may also be used for modulator 620 in FIG. 6. A TX data processor 712, which may be part of TX data and control processor 610 in FIG. 6, may receive data to send, encode the data based on a coding scheme to obtain code bits, interleave the code bits, and map the interleaved bits to modulation symbols based on a modulation scheme, e.g., QPSK, 16-QAM, 64-QAM, etc. The code rate and modulation scheme may be selected based on uplink channel conditions, which may be estimated by Node B 110 and signaled to UE 120.

Within modulator 620*b*, a serial-to-parallel converter (S/P) 724 may receive the modulation symbols from TX data processor 712 and provide Q modulation symbols in each non-pilot symbol period, where Q is the number of subcarriers in the data segment assigned to UE 10. A discrete Fourier transform (DFT) unit 728 may perform a Q-point DFT on the Q modulation symbols to transform these symbols from the time domain to the frequency domain and may provide Q frequency-domain symbols. Spectral shaping unit 730 may perform spectral shaping on the Q frequency-domain symbols and provide Q spectrally shaped symbols. Symbol-to-subcarrier mapping unit 732 may map the Q spectrally shaped symbols to the Q subcarriers in the data segment and may map zero symbols to the N-Q remaining subcarriers. IDFT unit 734 may perform an N-point IDFT on the N mapped symbols from unit 732 and provide N time-domain output chips. P/S 736 may serialize the N output chips, and cyclic prefix generator 738 may append a cyclic prefix to form an SC-FDM symbol containing N+C output chips.

Figure 10:
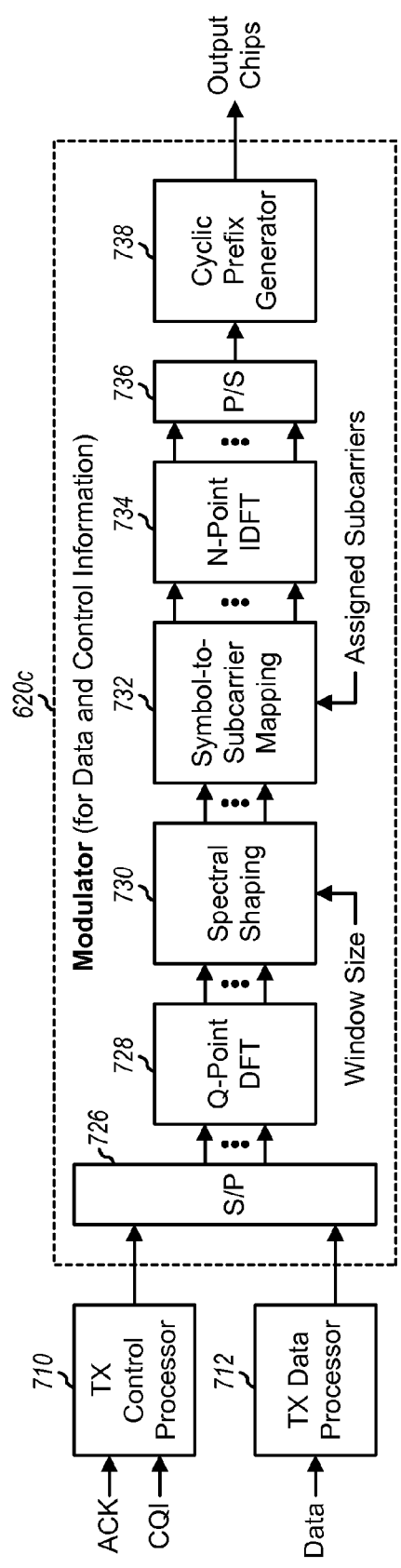
FIG. 10 shows a block diagram of a modulator for control information and data.

FIG. 10 shows a block diagram of a design of a modulator 620*c* for data and control information. Modulator 620*c* may also be used for modulator 620 in FIG. 6. TX control processor 710 may process control information and provide modulation symbols for control information to modulator 620*c*. TX data processor 712 may process data and provide modulation symbols for data to modulator 620*c*.

Within modulator 620*c*, an S/P 726 may receive the modulation symbols from TX control processor 710 and the modulation symbols from TX data processor 712. S/P 726 may provide Q modulation symbols in each non-pilot symbol period, where Q is the number of subcarriers in the data segment assigned to UE 10. The Q modulation symbols may be processed by DFT unit 728, spectral shaping unit 730, symbol-to-subcarrier mapping unit 732, IDFT unit 734, S/P 736, and cyclic prefix generator 738 as described above for FIG. 9 to generate an SC-FDM symbol containing N+C output chips.

Control information may be processed and sent with data in the data segment in various manners. Some designs for processing and sending control information with data are described below.

In one design, TX control processor 710 may generate modulation symbols for control information in the same manner (e.g., based on a predetermined coding and modulation scheme) regardless of whether control information is sent alone or with data. If control information is sent alone then TX control processor 710 may provide the modulation symbols for control information to modulator 620*a* in FIG. 7. If control information is sent with data, then TX control processor 710 may further process the modulation symbols. In one design, TX control processor 710 may repeat a modulation symbol for control information (e.g., ACK) a sufficient number of times to achieve the desired reliability. In another design, TX control processor 710 may spread a modulation symbol for control information with an orthogonal code of length W to generate W spread modulation symbols, where W may be equal to or less than M. TX control processor 710 may perform repetition for one type of control information, spreading for another type of control information, and/or other processing for other types of control information. In any case, TX control processor 710 may provide all of the repeated and/or spread modulation symbols for control information to modulator 620*c*.

In another design, TX control processor 710 may generate modulation symbols for control information (i) based on a predetermined modulation scheme (e.g., QPSK) when data is not sent or (ii) based on a modulation scheme (e.g., 16-QAM, 64-QAM, etc.) used for data when data is sent. For example, when control information is sent with data, the modulation scheme for CQI may change from QPSK to the modulation scheme used for data, and the coding basis for ACK may change from the Chu sequence to a repetition code followed by a change from QPSK to the modulation scheme used for data. TX control processor 710 may use the same coding scheme for control information regardless of the modulation scheme used for control information. Alternatively, TX control processor 710 may select a coding scheme or a code rate based on the modulation scheme used for control information.

In one design, TX data processor 712 may generate modulation symbols for data in the same manner regardless of whether data is sent alone or with control information. S/P 726 may puncture (or replace) some of the modulation symbols for data with the modulation symbols for control information when control information is sent with data. In another design, TX data processor 712 may generate fewer modulation symbols for data (e.g., by adjusting the code rate) when control information is sent with data. S/P 726 may multiplex the modulation symbols for control information with the modulation symbols for data. The modulation symbols for control information may also be sent with the modulation symbols for data in other manners, e.g., with superposition using hierarchical coding.

In the design shown in FIG. 10, the modulation symbols for control information may puncture or may be multiplexed with the modulation symbols for data, prior to the DFT by unit 726. This design ensures that an SC-FDM waveform, which may be generated by a DFT operation followed by an IDFT operation when only data or both data and control information are sent, is preserved. In another design, the modulation symbols for control information may puncture or may be multiplexed with the modulation symbols for data after the DFT, e.g., prior to mapping unit 732.

As shown in FIGS. 7 and 10, control information may be sent using different processing schemes depending on whether control information is sent alone or with data. When sent alone, control information may be sent using a CAZAC sequence to achieve a lower PAR. The lower PAR may allow for use of higher transmit power, which may improve link margin. When sent with data, control information may be multiplexed with data and processed in similar manner as data. This may allow control information to be recovered using the same techniques used for data, e.g., coherent demodulation based on pilot symbols sent with the modulation symbols. Control information may also be sent in other manners. For example, control information may be sent using code division multiplexing (CDM), e.g., by spreading each modulation symbol for control information with an orthogonal code and mapping the spread modulation symbols to subcarriers used for control information.

Figure 11:
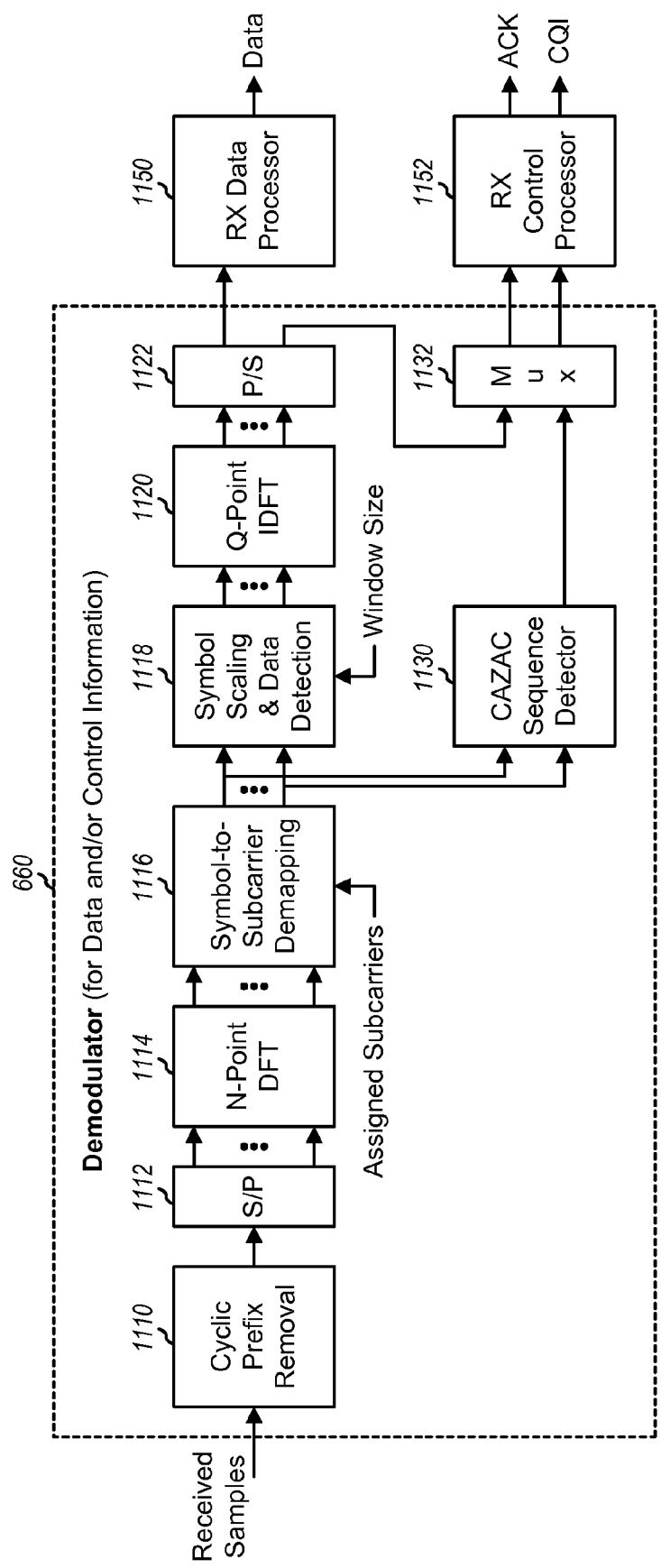
FIG. 11 shows a block diagram of a demodulator.

FIG. 11 shows a block diagram of a design of demodulator 660 at Node B 110 in FIG. 6. Within demodulator 660, a cyclic prefix removal unit 1110 may obtain N+C received samples in each SC-FDM symbol period, remove C received samples corresponding to the cyclic prefix, and provide N received samples for the useful portion of a received SC-FDM symbol. An S/P 1112 may provide the N received samples in parallel. A DFT unit 1114 may perform an N-point DFT on the N received samples and provide N received symbols for the N total subcarriers. These N received symbols may contain data and control information for all UEs transmitting to Node B 110. The processing to recover control information and/or data from UE 120 is described below.

If control information and data are sent by UE 120, then a symbol-to-subcarrier demapping unit 1116 may provide Q received symbols from the Q subcarriers in the data segment assigned to UE 120 and may discard the remaining received symbols. A unit 1118 may scale the Q received symbols based on the spectral shaping performed by UE 120. Unit 1118 may further perform data detection (e.g., matched filtering, equalization, etc.) on the Q scaled symbols with channel gain estimates and provide Q detected symbols. An IDFT unit 1120 may perform a Q-point IDFT on the Q detected symbols and provide Q demodulated symbols for data and control information. A P/S 1122 may provide demodulated symbols for data to an RX data processor 1150 and may provide demodulated symbols for control information to a multiplexer (Mux) 1132, which may provide these symbols to an RX control processor 1152. Processors 1150 and 1152 may be part of RX data and control processor 670 in FIG. 6. RX data processor 1150 may process (e.g., symbol demap, deinterleave, and decode) the demodulated symbols for data and provide decoded data. RX control processor 1152 may process the demodulated symbols for control information and provide decoded control information, e.g., ACK and/or CQI.

If control information and no data is sent by UE 120, then symbol-to-subcarrier demapping unit 1116 may provide M received symbols from the M subcarriers in the control segment assigned to UE 120 and may discard the remaining received symbols. A CAZAC sequence detector 1130 may detect a modulation symbol most likely to have been sent in a symbol period based on the M received symbols for that symbol period. Detector 1130 may provide demodulated symbols for control information, which may be routed through multiplexer 1132 and provided to RX control processor 1152.

If only data is sent by UE 120, then symbol-to-subcarrier demapping unit 1116 may provide Q received symbols from the Q subcarriers in the data segment and may discard the remaining received symbols. These Q received symbols may be scaled and detected by unit 1118, transformed by IDFT unit 1120, and routed via P/S 1122 to RX data processor 1150.

Figure 12:
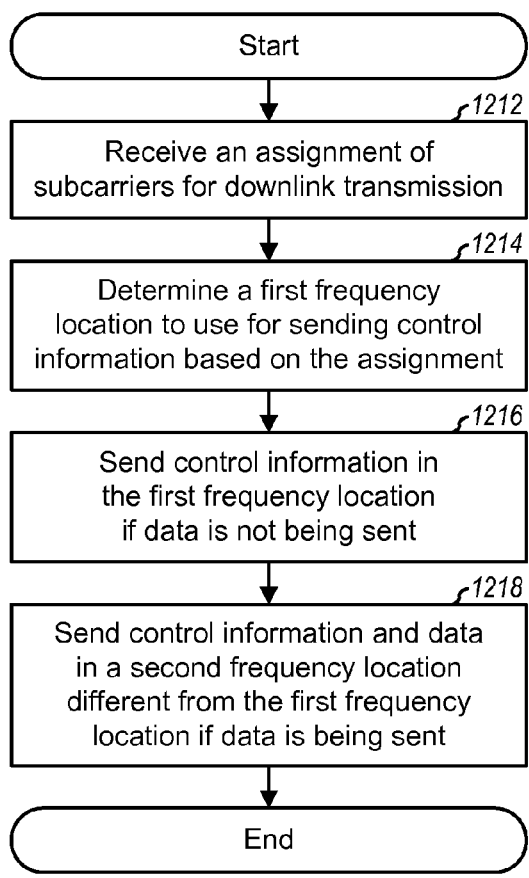
FIGS. 12 and 13 show a process and an apparatus, respectively, for sending control information in different frequency locations.

FIG. 12 shows a design of a process 1200 for sending control information. Process 1200 may be performed by a UE. An assignment of subcarriers for downlink transmission may be received (block 1212). A first frequency location to use for sending control information may be determined based on the assignment (block 1214). The first frequency location may also be assigned explicitly or determined in other manners. Control information may be sent in the first frequency location if data is not being sent (block 1216). Control information and data may be sent in a second frequency location that is different from the first frequency location if data is being sent (block 1218). The control information may comprise ACK information, CQI information, and/or other information.

The first frequency location may correspond to a first set of subcarriers assigned to the UE for sending control information. The second frequency location may correspond to a second set of subcarriers assigned to the UE for sending data. Control information and/or data may be sent on contiguous subcarriers in each symbol period in which control information and/or data is sent. Control information may also be sent in different frequency locations in different time intervals with frequency hopping, e.g., as shown in FIGS. 5A and 5B.

Control information may be processed to obtain modulation symbols. Data may also be processed to obtain modulation symbols. The modulation symbols for control information may be multiplexed with the modulation symbols for data. Alternatively, some of the modulation symbols for data may be punctured with the modulation symbols for control information. SC-FDM symbols may be generated with control information mapped to the first frequency location if data is not being sent. SC-FDM symbols may be generated with control information and data mapped to the second frequency location if data is being sent.

Figure 13:
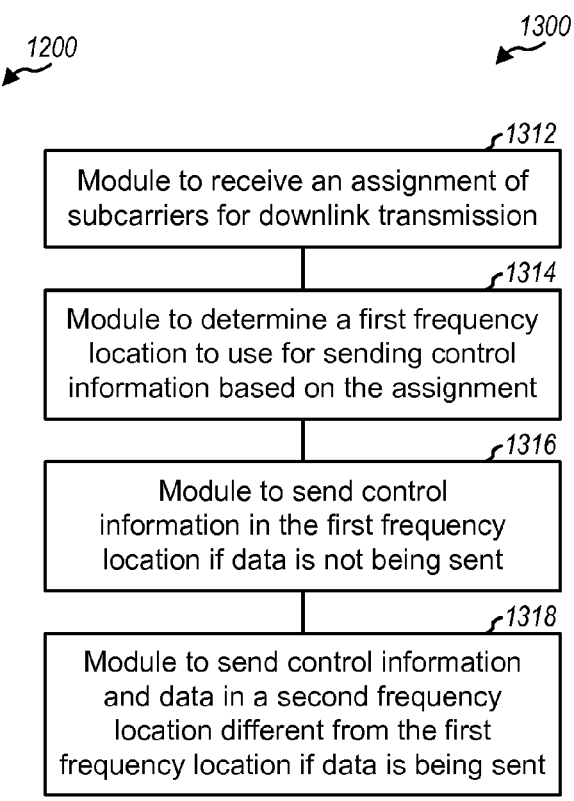

FIG. 13 shows a design of an apparatus 1300 for sending control information. Apparatus 1300 includes means for receiving an assignment of subcarriers for downlink transmission (module 1312), means for determining a first frequency location to use for sending control information based on the assignment (module 1314), means for sending control information in the first frequency location if data is not being sent (module 1316), and means for sending control information and data in a second frequency location that is different from the first frequency location if data is being sent (module 1318).

Figure 14:
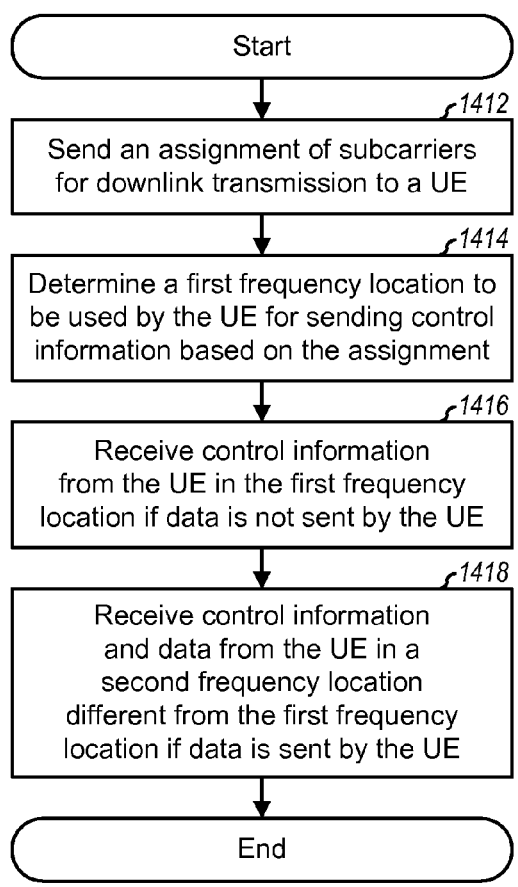
FIGS. 14 and 15 show a process and an apparatus, respectively, for receiving control information from different frequency locations.

FIG. 14 shows a design of a process 1400 for receiving control information. Process 1400 may be performed by a Node B. An assignment of subcarriers for downlink transmission may be sent to a UE (block 1412). A first frequency location to be used by the UE for sending control information may be determined based on the assignment (block 1414). Control information may be received from the UE in the first frequency location if data is not sent by the UE (block 1416). Control information and data may be received from the UE in a second frequency location that is different from the first frequency location if data is sent by the UE (block 1418).

Received SC-FDM symbols may be processed to obtain received symbols. If data is not sent by the UE, then received symbol for control information may be obtained from the first frequency location, e.g., a first set of contiguous subcarriers. These received symbols may be detected and processed to obtain control information sent by the UE. If data is sent by the UE, then received symbols for control information and data may be obtained from the second frequency location, e.g., a second set of contiguous subcarriers. These received symbols may be converted from frequency domain to time domain and may then be demultiplexed to obtain demodulated symbols for control information and demodulated symbols for data, e.g., as shown in FIG. 11. The demodulated symbols for control information may be processed to obtain control information sent by the UE. The demodulated symbols for data may be processed to obtain data sent by the UE.

Figure 15:
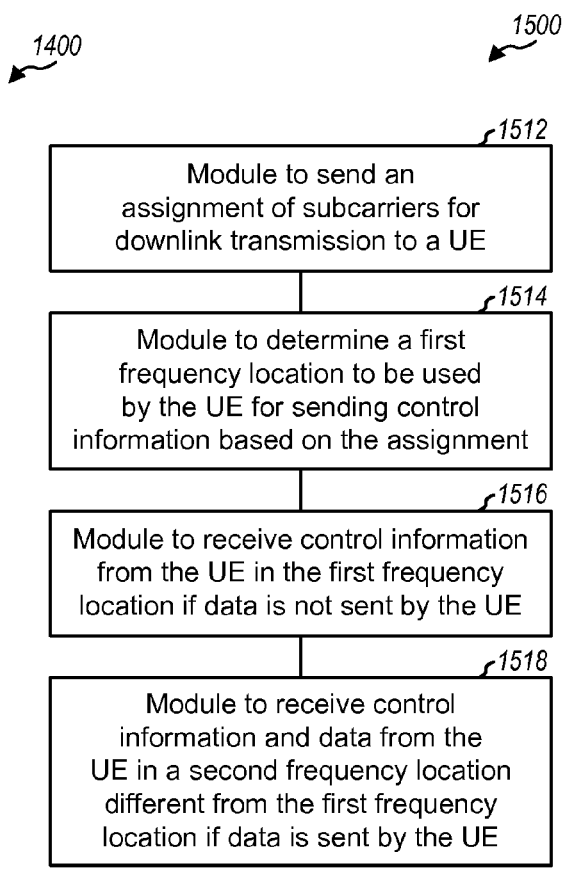

FIG. 15 shows a design of an apparatus 1500 for receiving control information. Apparatus 1500 includes means for sending an assignment of subcarriers for downlink transmission to a UE (module 1512), means for determining a first frequency location to be used by the UE for sending control information based on the assignment (module 1514), means for receiving control information from the UE in the first frequency location if data is not sent by the UE (module 1516), and means for receiving control information and data from the UE in a second frequency location that is different from the first frequency location if data is sent by the UE (module 1518).

Figure 16:
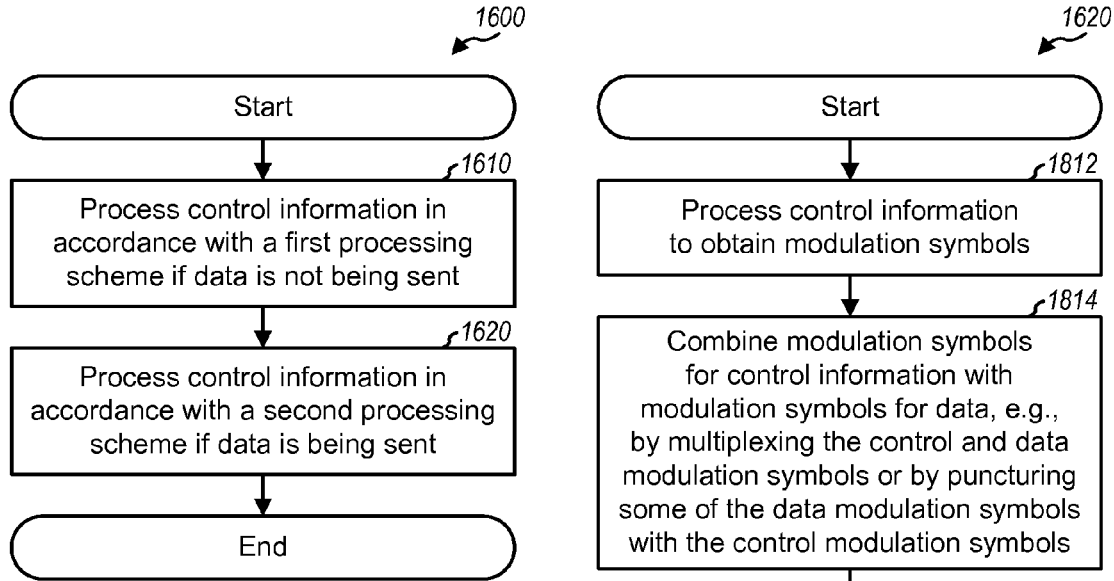

FIG. 16 shows a design of a process 1600 for sending control information. Process 1600 may be performed by a UE. Control information may be processed in accordance with a first processing scheme if data is not being sent (block 1610). Control information may be processed in accordance with a second processing scheme if data is being sent (block 1620). The control information may comprise ACK information, CQI information, etc.

Figure 17:
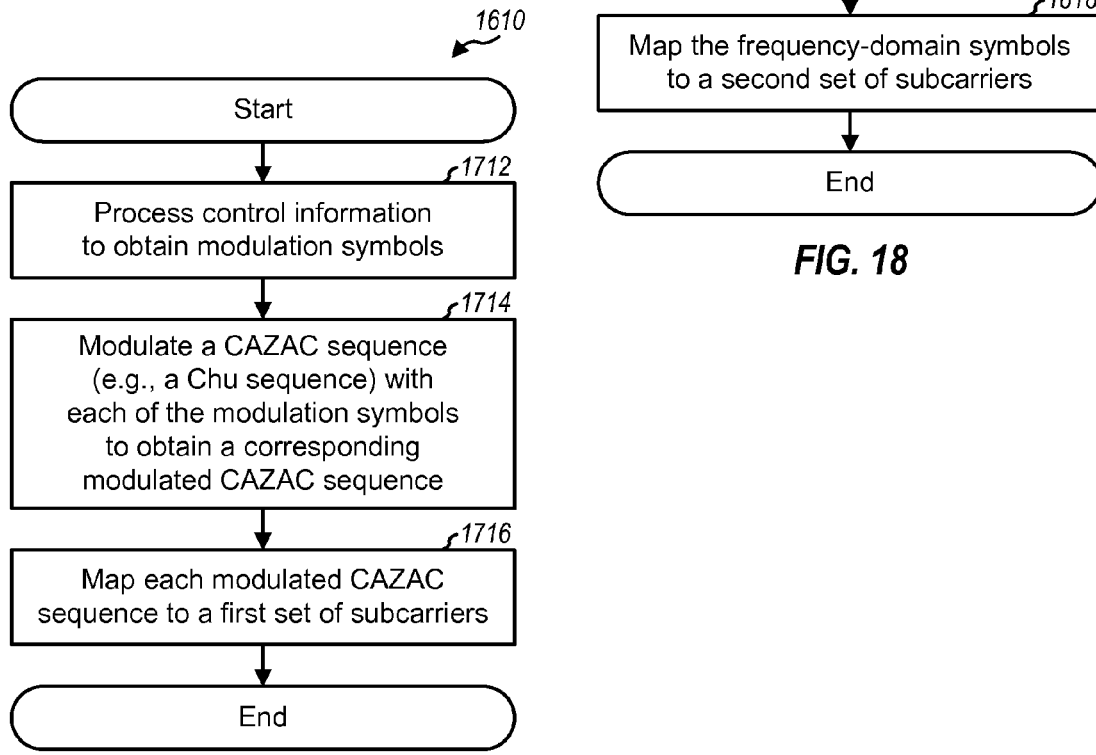

FIG. 17 shows a design of the first processing scheme in block 1610. Control information may be processed to obtain modulation symbols (block 1712). A CAZAC sequence (e.g., a Chu sequence) may be modulated with each of the modulation symbols to obtain a corresponding modulated CAZAC sequence (block 1714). Each modulated CAZAC sequence may be mapped to a first set of subcarriers (block 1716). The first processing scheme may also perform processing in other manners.

Figure 18:
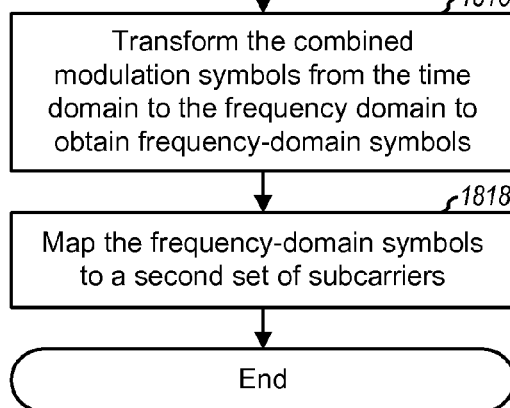

FIG. 18 shows a design of the second processing scheme in block 1620. Control information may be processed to obtain modulation symbols (block 1812). The modulation symbols for control information may be combined with modulation symbols for data (block 1814). The combining may be achieved by multiplexing the modulation symbols for control information with modulation symbols for data, by puncturing some of the modulation symbols for data with the modulation symbols for control information, etc. The combined modulation symbols may be transformed from the time domain to the frequency domain to obtain frequency-domain symbols (block 1816). The frequency-domain symbols may be mapped to a second set of subcarriers (block 1818). The second processing scheme may also perform processing in other manners.

In one design of the first processing scheme, an ACK may be mapped to a modulation symbol. A Chu sequence may be modulated with the modulation symbol to obtain a modulated Chu sequence for the ACK. The modulated Chu sequence may be mapped to the first set of subcarriers in one symbol period. In one design of the second processing scheme, the ACK may be mapped to a modulation symbol. The modulation symbol may be repeated multiple times to obtain repeated modulation symbols or may be spread with an orthogonal sequence to obtain spread modulation symbols. The repeated or spread modulation symbols for the ACK may be combined with modulation symbols for data. The combined modulation symbols may be mapped to the second set of subcarriers.

The modulation symbols for control information may be generated based on a first modulation scheme if data is not being sent and based on a second modulation scheme if data is being sent. The first modulation scheme may be a fixed modulation scheme, e.g., QPSK. The second modulation scheme may be the modulation scheme used for data. Control information may also be encoded based on a first coding scheme if data is not being sent and based on a second coding scheme if data is being sent.

If data is not being sent by the UE, then frequency-domain symbols may be obtained for control information and mapped to the first set of contiguous subcarriers used for control information. If data is being sent by the UE, then frequency-domain symbols may be obtained for control information and data and mapped to the second set of contiguous subcarriers used for data. SC-FDM symbols may be generated based on the mapped symbols.

FIG. 19 shows a design of an apparatus 1900 for sending control information. Apparatus 1900 includes means for processing control information in accordance with a first processing scheme if data is not being sent (module 1910) and means for processing control information in accordance with a second processing scheme if data is being sent (module 1920).

FIG. 20 shows a design of module 1910 in FIG. 19. Module 1910 includes means for processing control information to obtain modulation symbols (module 2012), means for modulating a CAZAC sequence with each of the modulation symbols to obtain a corresponding modulated CAZAC sequence (module 2014), and means for mapping each modulated CAZAC sequence to a first set of subcarriers (module 2016).

FIG. 21 shows a design of module 1920 in FIG. 19. Module 1920 includes means for processing control information to obtain modulation symbols (module 2112), means for combining the modulation symbols for control information with modulation symbols for data (module 2114), means for transforming the combined modulation symbols from the time domain to the frequency domain to obtain frequency-domain symbols (module 2116), and means for mapping the frequency-domain symbols to a second set of subcarriers (module 2118).

FIG. 22 shows a design of a process 2200 for receiving control information. Process 2200 may be performed by a Node B. Received SC-FDM symbols may be processed to obtain received symbols for N total subcarriers. Received symbols for a UE may be obtained from a first set of subcarriers if data is not sent by the UE or from a second set of subcarriers if data is sent by the UE (block 2212). The received symbols for the UE may be processed in accordance with a first processing scheme to obtain control information for the UE if data is not sent by the UE (block 2214). The received symbols for the UE may be processed in accordance with a second processing scheme to obtain control information for the UE if data is sent by the UE (block 2216).

In one design of the first processing scheme, detection may be performed on the received symbols based on a CAZAC sequence to obtain demodulated symbols. The demodulated symbols may be processed to obtain control information sent by the UE. In one design of the second processing scheme, data detection may be performed on the received symbols to obtain detected symbols. The detected symbols may be transformed from the frequency domain to the time domain to obtain demodulated symbols. The demodulated symbols may be further processed to obtain control information sent by the UE. In general, the first and second processing schemes may be performed in a manner complementary to the processing performed by the UE.

FIG. 23 shows a design of an apparatus 2300 for receiving control information. Apparatus 2300 includes means for obtaining received symbols for a UE from a first set of subcarriers if data is not sent by the UE or from a second set of subcarriers if data is sent by the UE (module 2312), means for processing the received symbols for the UE in accordance with a first processing scheme to obtain control information for the UE if data is not sent by the UE (module 2314), and means for processing the received symbols for the UE in accordance with a second processing scheme to obtain control information for the UE if data is sent by the UE (module 2316).

Figure 24:
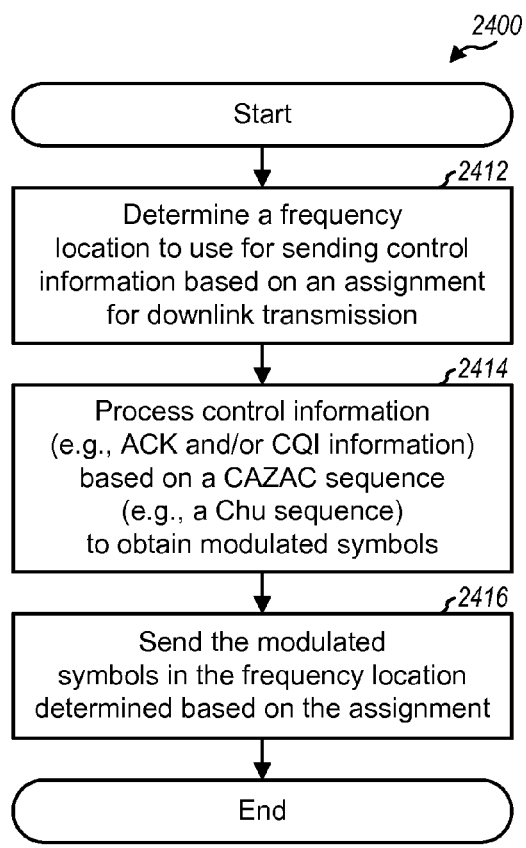
FIGS. 24 and 25 show a process and an apparatus, respectively, for sending control information.

FIG. 24 shows a design of a process 2400 for sending control information. Process 2400 may be performed by a UE. A frequency location to use for sending control information may be determined based on an assignment for downlink transmission (block 2412). Control information (e.g., ACK information, CQI information, etc.) may be processed based on a CAZAC sequence (e.g., a Chu sequence) to obtain modulated symbols (block 2414). The modulated symbols may be sent in the frequency location determined based on the assignment (block 2416).

For example, an ACK may be mapped to a modulation symbol. The CAZAC sequence may be modulated with the modulation symbol to obtain modulated symbols for a modulated CAZAC sequence. The modulated symbols may be sent in a set of contiguous subcarriers in the frequency location determined based on the assignment. The control information may be sent in different frequency locations in different time intervals with frequency hopping.

Figure 25:
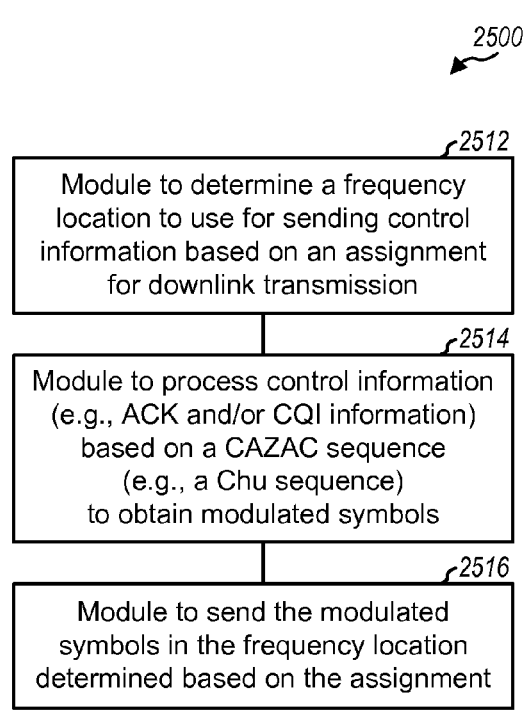

FIG. 25 shows a design of an apparatus 2500 for sending control information. Apparatus 2500 includes means for determining a frequency location to use for sending control information based on an assignment for downlink transmission (module 2512), means for processing control information based on a CAZAC sequence to obtain modulated symbols (module 2514), and means for sending the modulated symbols in the frequency location determined based on the assignment (module 2516).

For clarity, transmission of control information and data on the uplink with SC-FDM has been described. The techniques may also be used for transmission of control information and data on the downlink. The control information and data may also be sent with OFDM or some other modulation techniques with multiple subcarriers.

The modules in FIGS. 13, 15, 19, 20, 21, 23 and 25 may comprise processors, electronics devices, hardware devices, electronics components, logical circuits, memories, etc., or any combination thereof.

The techniques described herein may be implemented by various means. For example, these techniques may be implemented in hardware, firmware, software, or a combination thereof. For a hardware implementation, the processing units used to perform the techniques at an entity (e.g., a UE or a Node B) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 642 or 682 in FIG. 6) and executed by a processor (e.g., processor 640 or 680). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured to determine a time interval in which to send control information, to determine whether data is being sent in the time interval, to send only the control information in the time interval at a first frequency location within a first frequency range if the data is not being sent in the time interval, and to send both the control information and the data in the time interval at a second frequency location within a second frequency range if the data is being sent in the time interval, the first frequency range being non-overlapping with the second frequency range; and a memory coupled to the at least one processor.

2. The apparatus of claim 1, wherein the at least one processor is configured to receive an assignment of subcarriers for downlink transmission, and to determine the first frequency location based on the assignment.

3. The apparatus of claim 1, wherein the first frequency location corresponds to a first set of subcarriers assigned for sending the control information, and wherein the second frequency location corresponds to a second set of subcarriers assigned for sending the data.

4. The apparatus of claim 1, wherein the at least one processor is configured to send only the control information, or only the data, or both the control information and the data on contiguous subcarriers in each symbol period in which the control information, or the data, or both are sent.

5. The apparatus of claim 1, wherein if the data is not being sent in the time interval the at least one processor is configured to generate symbols for only the control information and to map the symbols for only the control information to a first set of subcarriers corresponding to the first frequency location.

6. The apparatus of claim 5, wherein if the data is being sent in the time interval the at least one processor is configured to generate symbols for both the control information and the data and to map the symbols for both the control information and the data to a second set of subcarriers corresponding to the second frequency location.

7. The apparatus of claim 1, wherein the at least one processor is configured to generate single-carrier frequency division multiplexing (SC-FDM) symbols with only the control information mapped to the first frequency location if the data is not being sent in the time interval, and to generate SC-FDM symbols with both the control information and the data mapped to the second frequency location if the data is being sent in the time interval.

8. The apparatus of claim 1, wherein the at least one processor is configured to send only the control information at different frequency locations in different time intervals with frequency hopping.

9. The apparatus of claim 1, wherein the control information comprises acknowledgement (ACK) information, or channel quality indicator (CQI) information, or both.

10. A method of wireless communication, comprising:
determining a time interval in which to send control information;
determining whether data is being sent in the time interval;
sending only the control information in the time interval at a first frequency location within a first frequency range if the data is not being sent in the time interval; and
sending both the control information and the data in the time interval at a second frequency location within a second frequency range if the data is being sent in the time interval, the first frequency range being non-overlapping with the second frequency range.

11. The method of claim 10, further comprising:
receiving an assignment of subcarriers for downlink transmission; and
determining the first frequency location based on the assignment.

12. The method of claim 10, wherein the sending only the control information in the first frequency location comprises
generating symbols for only the control information, and
mapping the symbols for only the control information to a first set of subcarriers corresponding to the first frequency location.

13. The method of claim 12, wherein the sending both the control information and the data in the second frequency location comprises
generating symbols for both the control information and the data, and
mapping the symbols for both the control information and the data to a second set of subcarriers corresponding to the second frequency location.

14. An apparatus for wireless communication, comprising:
means for determining a time interval in which to send control information;
means for determining whether data is being sent in the time interval;
means for sending only the control information in the time interval at a first frequency location within a first frequency range if the data is not being sent in the time interval; and
means for sending both the control information and the data in the time interval at a second frequency location within a second frequency range if the data is being sent in the time interval, the first frequency range being non-overlapping with the second frequency range.

15. The apparatus of claim 14, further comprising:
means for receiving an assignment of subcarriers for downlink transmission; and
means for determining the first frequency location based on the assignment.

16. The apparatus of claim 14, wherein the means for sending only the control information in the first frequency location comprises
means for generating symbols for only the control information, and
means for mapping the symbols for only the control information to a first set of subcarriers corresponding to the first frequency location.

17. The apparatus of claim 16, wherein the means for sending both the control information and the data in the second frequency location comprises
means for generating symbols for both the control information and the data, and
means for mapping the symbols for both the control information and the data to a second set of subcarriers corresponding to the second frequency location.

18. A non-transitory processor-readable medium including instructions stored thereon, comprising:
instructions for determining a time interval in which to send control information,
instructions for determining whether data is being sent in the time interval;
instructions for sending only the control information in the time interval at a first frequency location within a first frequency range if the data is not being sent in the time interval; and
instructions for sending both the control information and the data in the time interval at a second frequency location within a second frequency range if the data is being sent in the time interval, the first frequency range being non-overlapping with the second frequency range.

19. The non-transitory processor-readable medium of claim 18, further comprising:
instructions for receiving an assignment of subcarriers for downlink transmission; and
instructions for determining the first frequency location based on the assignment.

20. The non-transitory processor-readable medium of claim 18, wherein the instructions for sending only the control information comprise instructions for generating symbols for only the control information, and instructions for mapping the symbols for only the control information to a first set of subcarriers corresponding to the first frequency location.

21. The non-transitory processor-readable medium of claim 20, wherein the instructions for sending both the control information and the data comprise instructions for generating symbols for both the control information and the data, and instructions for mapping the symbols for both the control information and the data to a second set of subcarriers corresponding to the second frequency location.

22. An apparatus for wireless communication, comprising:

at least one processor configured to determine a time interval in which to receive control information from a user equipment (UE), to determine whether data is being sent by the UE in the time interval, to receive only the control information from the UE in the time interval at a first frequency location within a first frequency range if the data is not sent by the UE in the time interval, and to receive both the control information and the data from the UE in the time interval at a second frequency location within a second frequency range if the data is sent by the UE in the time interval, the first frequency range being non-overlapping with the second frequency range; and a memory coupled to the at least one processor.

23. The apparatus of claim 22, wherein the at least one processor is configured to send an assignment of subcarriers for downlink transmission to the UE, and to determine the first frequency location based on the assignment.

24. The apparatus of claim 22, wherein if the data is not sent by the UE in the time interval the at least one processor is configured to obtain received symbols from a first set of subcarriers corresponding to the first frequency location, and to obtain demodulated symbols for the control information based on the received symbols.

25. The apparatus of claim 24, wherein if the data is sent by the UE in the time interval the at least one processor is configured to obtain received symbols from a second set of subcarriers corresponding to the second frequency location, to obtain demodulated symbols based on the received symbols, and to demultiplex the demodulated symbols to obtain demodulated symbols for the control information and demodulated symbols for the data.

26. The apparatus of claim 22, wherein the at least one processor is configured to process received single-carrier frequency division multiplexing (SC-FDM) symbols to obtain received symbols for only the control information from the first frequency location if the data is not sent by the UE in the time interval, and to process the received SC-FDM symbols to obtain received symbols for both the control information and the data from the second frequency location if the data is sent by the UE in the time interval.

27. A method of wireless communication, comprising:

determining a time interval in which to receive control information from a user equipment (UE);

determining whether data is being sent by the UE in the time interval;

receiving only the control information from the UE in the time interval at a first frequency location within a first frequency range if the data is not sent by the UE in the time interval; and receiving both the control information and the data from the UE in the time interval at a second frequency location within a second frequency range if the data is sent by the UE in the time interval, the first frequency range being non-overlapping with the second frequency range.

28. The method of claim 27, further comprising:

sending an assignment of subcarriers for downlink transmission to the UE; and determining the first frequency location based on the assignment.

29. The method of claim 27, wherein the receiving only the control information from the UE in the first frequency location comprises obtaining received symbols from a first set of subcarriers corresponding to the first frequency location, and obtaining demodulated symbols for the control information based on the received symbols.

30. The method of claim 29, wherein the receiving both the control information and the data from the UE in the second frequency location comprises obtaining received symbols from a second set of subcarriers corresponding to the second frequency location, obtaining demodulated symbols based on the received symbols, and demultiplexing the demodulated symbols to obtain demodulated symbols for the control information and demodulated symbols for the data.

31. The method of claim 10, wherein the control information comprises acknowledgement (ACK) information, or channel quality indicator (CQI) information, or both.

32. The method of claim 10, wherein the first frequency range is at an edge of system bandwidth and is designated for sending control information, and wherein the second frequency range covers a middle portion of the system bandwidth and is usable for sending only data or both data and control information.

33. The method of claim 10, wherein the first frequency location corresponds to a first set of subcarriers assigned for sending the control information, and wherein the second frequency location corresponds to a second set of subcarriers assigned for sending the data.

34. The method of claim 33, wherein the first set of subcarriers is for a Physical Uplink Control Channel (PUCCH), and wherein the second set of subcarriers is for a Physical Uplink Shared Channel (PUSCH).

35. The method of claim 27, wherein the control information comprises acknowledgement (ACK) information, or channel quality indicator (CQI) information, or both.

36. The method of claim 27, wherein the first frequency range is at an edge of system bandwidth and is designated for sending control information, and wherein the second frequency range covers a middle portion of the system bandwidth and is usable for sending only data or both data and control information.

37. The method of claim 27, wherein the first frequency location corresponds to a first set of subcarriers assigned for sending the control information, and wherein the second frequency location corresponds to a second set of subcarriers assigned for sending the data.

38. The method of claim 37, wherein the first set of subcarriers is for a Physical Uplink Control Channel (PUCCH), and wherein the second set of subcarriers is for a Physical Uplink Shared Channel (PUSCH).

39. An apparatus for wireless communication, comprising:

means for determining a time interval in which to receive control information from a user equipment (UE);

means for determining whether data is being sent by the UE in the time interval;

means for receiving only the control information from the UE in the time interval at a first frequency location within a first frequency range if the data is not sent by the UE in the time interval; and means for receiving both the control information and the data from the UE in the time interval at a second frequency location within a second frequency range if the data is sent by the UE in the time interval, the first frequency range being non-overlapping with the second frequency range.

40. The apparatus of claim 39, further comprising:

means for sending an assignment of subcarriers for downlink transmission to the UE; and means for determining the first frequency location based on the assignment.

41. The apparatus of claim 39, wherein the means for receiving only the control information from the UE in the first frequency location comprises means for obtaining received symbols from a first set of subcarriers corresponding to the first frequency location, and means for obtaining demodulated symbols for the control information based on the received symbols.

42. The apparatus of claim 41, wherein the means for receiving both the control information and the data from the UE in the second frequency location comprises means for obtaining received symbols from a second set of subcarriers corresponding to the second frequency location, means for obtaining demodulated symbols based on the received symbols, and means for demultiplexing the demodulated symbols to obtain demodulated symbols for the control information and demodulated symbols for the data.

43. A non-transitory processor-readable medium including instructions stored thereon, comprising:

instructions for determining a time interval in which to receive control information from a user equipment (UE);

instructions for determining whether data is being sent by the UE in the time interval;

instructions for receiving only the control information from the UE in the time interval at a first frequency location within a first frequency range if the data is not sent by the UE in the time interval; and instructions for receiving both the control information and the data from the UE in the time interval at a second frequency location within a second frequency range if the data is sent by the UE in the time interval, the first frequency range being non-overlapping with the second frequency range.

* * * * *